United States Patent
Chincholi et al.

(10) Patent No.: US 9,413,500 B2
(45) Date of Patent: Aug. 9, 2016

(54) METHOD AND APPARATUS FOR DYNAMIC BANDWIDTH PROVISIONING IN FREQUENCY DIVISION DUPLEX SYSTEMS

(75) Inventors: Amith V. Chincholi, West Babylon, NY (US); Alpaslan Demir, East Meadow, NY (US); Tanbir Haque, Jackson Heights, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 13/232,367

(22) Filed: Sep. 14, 2011

(65) Prior Publication Data

US 2012/0063373 A1    Mar. 15, 2012

Related U.S. Application Data

(60) Provisional application No. 61/383,181, filed on Sep. 15, 2010.

(51) Int. Cl.

| | | |
|---|---|---|
| *H04J 1/00* | (2006.01) | |
| *H04L 5/00* | (2006.01) | |
| *H04L 5/14* | (2006.01) | |
| *H04L 27/00* | (2006.01) | |
| *H04B 7/212* | (2006.01) | |
| *H04B 7/00* | (2006.01) | |

(52) U.S. Cl.
CPC .............. *H04L 5/0032* (2013.01); *H04L 5/001* (2013.01); *H04L 5/0064* (2013.01); *H04L 5/0071* (2013.01); *H04L 5/143* (2013.01); *H04L 27/0006* (2013.01); *H04B 7/00* (2013.01); *H04J 1/00* (2013.01); *H04L 5/0023* (2013.01); *H04L 5/0044* (2013.01)

(58) Field of Classification Search
USPC ................. 370/219, 280, 329, 330, 348, 281; 455/67.11, 522

See application file for complete search history.

(56) References Cited

U.S. PATENT DOCUMENTS

| | | | | |
|---|---|---|---|---|
| 7,512,094 | B1 * | 3/2009 | Linebarger et al. | ........... 370/329 |
| 8,265,684 | B2 * | 9/2012 | Sawai | ........... 455/522 |
| 8,325,670 | B2 * | 12/2012 | Afrashteh et al. | ........... 370/330 |

(Continued)

OTHER PUBLICATIONS http://www.moonblinkwifi.com/fddvstddwimax.cfm (last visited Oct. 13, 2011).

(Continued)

*Primary Examiner* — Helal A Algahaim
*Assistant Examiner* — Mahmoud Ismail
(74) *Attorney, Agent, or Firm* — Condo Roccia Koptiw LLP

(57) ABSTRACT

A method and apparatus are described that provides flexible spectrum usage by using a paired frequency division duplex (FDD) spectrum to enable dynamic access in television white space (TVWS), sub-leased spectrum or unlicensed spectrum, (e.g., industrial, scientific and medical (ISM) bands), in a femto cell environment or the like. Elastic FDD (E-FDD) enables femto cell operation in TVWS, sub-leased spectrum and/or unlicensed spectrum, either simultaneously with licensed spectrum or as an alternate channel to licensed spectrum. E-FDD enables dynamic asymmetric bandwidth allocation for uplink (UL) and downlink (DL) in FDD, and enables variable duplex spacing, (i.e., using FDD with minimum duplex spacing between DL and UL spectrum, or, using hybrid-FDD, (FDD in a time duplexed fashion), when a spectrum gap between the UL and DL spectrum is below a certain minimum threshold. Additionally, the signaling enhancements to implement E-FDD are also provided.

20 Claims, 21 Drawing Sheets

(56) References Cited

U.S. PATENT DOCUMENTS

| | | | | |
|---|---|---|---|---|
| 2001/0006517 | A1* | 7/2001 | Lin et al. | 370/348 |
| 2008/0268892 | A1* | 10/2008 | Hamdi et al. | 455/522 |
| 2010/0124886 | A1* | 5/2010 | Fordham et al. | 455/67.11 |
| 2010/0226330 | A1 | 9/2010 | Haque et al. | |
| 2011/0205941 | A1* | 8/2011 | Stanforth | 370/280 |
| 2012/0140802 | A1* | 6/2012 | Sutton | 375/219 |
| 2012/0263079 | A1* | 10/2012 | Struhsaker | 370/280 |

OTHER PUBLICATIONS

Third Generation Partnership Project, "Technical Specification Group Radio Access Network; Mobility Procedures for Home NodeB; Overall Description; Stage 2 (Release 8)," 3GPP TS 25.367 v8.3.0, Dec. 2009.

Third Generation Partnership Project, "Technical Specification Group Radio Access Network; Mobility Procedures for Home NodeB; Overall Description; Stage 2 (Release 9)," 3GPP TS 25.367 v9.4.0, Jun. 2010.

Third Generation Partnership Project, "Technical Specification Group Radio Access Network; Mobility Procedures for Home NodeB; Overall Description; Stage 2 (Release 9)," 3GPP TS 25.367 v9.5.0, Dec. 2010.

Third Generation Partnership Project, "Technical Specification Group Radio Access Network; Mobility Procedures for Home NodeB; Overall Description; Stage 2 (Release 10)," 3GPP TS 25.367 v10.0.0, Mar. 2011.

Third Generation Partnership Project, "Technical Specification Group Radio Access Network; Radio Resource Control (RRC); Protocol Specification (Release 7)," 3GPP TS 25.331 v7.17.0, Jun. 2010.

Third Generation Partnership Project, "Technical Specification Group Radio Access Network; Radio Resource Control (RRC); Protocol Specification (Release 7)," 3GPP TS 25.331 v7.20.0, Jun. 2011.

Third Generation Partnership Project, "Technical Specification Group Radio Access Network; Radio Resource Control (RRC); Protocol Specification (Release 8)," 3GPP TS 25.331 v8.11.0, Jun. 2010.

Third Generation Partnership Project, "Technical Specification Group Radio Access Network; Radio Resource Control (RRC); Protocol Specification (Release 8)," 3GPP TS 25.331 v8.15.0, Jun. 2011.

Third Generation Partnership Project, "Technical Specification Group Radio Access Network; Radio Resource Control (RRC); Protocol Specification (Release 9)," 3GPP TS 25.331 v9.3.0, Jun. 2010.

Third Generation Partnership Project, "Technical Specification Group Radio Access Network; Radio Resource Control (RRC); Protocol Specification (Release 9)," 3GPP TS 25.331 v9.7.0, Jul. 2011.

Third Generation Partnership Project, "Technical Specification Group Radio Access Network; Radio Resource Control (RRC); Protocol Specification (Release 10)," 3GPP TS 25.331 v10.0.0, Jun. 2010.

Third Generation Partnership Project, "Technical Specification Group Radio Access Network; Radio Resource Control (RRC); Protocol Specification (Release 10)," 3GPP TS 25.331 v10.4.0, Jul. 2011.

Third Generation Partnership Project, "Technical Specification Group Radio Access Network; UTRAN Architecture for 3G Home Node B (HNB); Stage 2 (Release 8)," 3GPP TS 25.467 v8.5.0, Mar. 2010.

Third Generation Partnership Project, "Technical Specification Group Radio Access Network; UTRAN Architecture for 3G Home Node B (HNB); Stage 2 (Release 8)," 3GPP TS 25.467 v8.6.0, Dec. 2010.

Third Generation Partnership Project, "Technical Specification Group Radio Access Network; UTRAN Architecture for 3G Home Node B (HNB); Stage 2 (Release 9)," 3GPP TS 25.467 v9.3.0, Jun. 2010.

Third Generation Partnership Project, "Technical Specification Group Radio Access Network; UTRAN Architecture for 3G Home Node B (HNB); Stage 2 (Release 9)," 3GPP TS 25.467 v9.4.1, Apr. 2011.

Third Generation Partnership Project, "Technical Specification Group Radio Access Network; UTRAN Architecture for 3G Home Node B (HNB); Stage 2 (Release 10)," 3GPP TS 25.467 v10.2.0, Jun. 2011.

Akyildiz et al., "NeXt generation/dynamic spectrum access/cognitive radio wireless networks: A survey," Computer Networks, vol. 50, No. 13, pp. 2127-2159 (Sep. 2006).

Leu et al., "A Framework for Cognitive WiMAX With Frequency Agility," Proceedings of the IEEE, vol. 97, Issue 4, pp. 755-773 (Apr. 2009).

Third Generation Partnership Project, "Technical Specification Group Radio Access Network; Mobilty Procedures for Home NodeB; Overall Description; Stage 2 (Release 8)," 3GPP TS 25.367 v.8.3.0, Dec. 2009.

Third Generation Partnership Project, "Technical Specification Group Radio Access Network; Mobilty Procedures for Home NodeB; Overall Description; Stage 2 (Release 9)," 3GPP TS 25.367 v.9.4.0, Jun. 2010.

Third Generation Partnership Project, "Technical Specification Group Radio Access Network; Mobilty Procedures for Home NodeB; Overall Description; Stage 2 (Release 9)," 3GPP TS 25.367 v.9.5.0, Dec. 2010.

Third Generation Partnership Project, "Technical Specification Group Radio Access Network; Mobilty Procedures for Home NodeB; Overall Description; Stage 2 (Release 10)," 3GPP TS 25.367 v.10.0.0, Mar. 2011.

Third Generation Partnership Project, "Technical Specification Group Radio Access Network; Radio Resource Control (RRC); Protocol Specification (Release 8)," 3GPP TS 25.331 v.8.15.0, Jun. 2011.

* cited by examiner

| MESSAGE NAME | DESCRIPTION | COMMENT |
|---|---|---|
| MASTER_SLAVE_MODE | MASTER/SLAVE MODE:<br>MASTER MODE: GENERATE BAND ALLOCATION PATTERN INTERNAL TO HOME(e)Node B AND SENDS ALLOCATION VECTOR TO UE<br>SLAVE MODE: READ BAND ALLOCATION PATTERN FROM HIGHER LAYERS (SENT FROM EXTERNAL NODE) | CARRIED IN THE MIB ON BCH |
| SPECTRUM_FRAG_LENGTH | MINIMUM FRAGMENT LENGTH THAT THE SPECTRUM CAN BE DIVIDED INTO. IN THE CASE OF OFDMA, IT IS THE SUBCARRIER SPACING | CARRIED IN THE MIB ON BCH OPTIONAL FOR LTE/LTE-A |
| DL_FREQ_START | LOWER FREQUENCY BAND EDGE OF DOWNLINK SPECTRUM | CARRIED IN THE MIB ON BCH |
| DL_FREQ_VECTOR | DOWNLINK CARRIERS:<br>VECTOR TO INDICATE WHICH SPECTRUM FRAGMENTS/SUB-CARRIERS ARE USED FOR DOWNLINK | CARRIED IN THE MIB ON BCH BINARY VECTOR FORMAT: NEED LOW LATENCY, EXTREMELY HIGH RELIABILITY COMMUNICATION |
| UL_FREQ_START | LOWER FREQUENCY BAND EDGE OF UPLINK SPECTRUM | CARRIED IN THE SIB TYPE 2 ON DL-SCH |
| UL_FREQ_VECTOR | UPLINK CARRIERS:<br>VECTOR TO INDICATE WHICH SPECTRUM FRAGMENTS/SUB-CARRIERS ARE USED FOR UPLINK | CARRIED IN THE SIB TYPE 2 ON DL-SCH BINARY VECTOR FORMAT: NEED LOW LATENCY, EXTREMELY HIGH RELIABILITY COMMUNICATION |

| MESSAGE NAME | DESCRIPTION | COMMENT |
|---|---|---|
| DUPLEX_MODE | FDD OR H-FDD DUPLEXING MODE. H-FDD MODE IS SIGNALED IF DUPLEX SPACING BETWEEN UL AND DL SPECTRUM IS BELOW A THRESHOLD | CARRIED IN THE MIB ON BCH |
| DL_HOP_AGGREG_MODE | 0: HOP MODE=> SHIFT OPERATION OF DL SPECTRUM FROM LICENSED SPECTRUM TO A DIFFERENT SPECTRUM<br>1: AGGREGATE MODE=> SIMULTANEOUS USAGE OF LICENSED DL SPECTRUM ALONG WITH A DIFFERENT SPECTRUM | CARRIED IN THE MIB ON BCH |
| UL_HOP_AGGREG_MODE | 0: HOP MODE=> SHIFT OPERATION OF UL SPECTRUM FROM LICENSED SPECTRUM TO A DIFFERENT SPECTRUM<br>1: AGGREGATE MODE=> SIMULTANEOUS USAGE OF LICENSED UL SPECTRUM ALONG WITH A DIFFERENT SPECTRUM | CARRIED IN THE MIB ON BCH |

FIG. 18B

| CRITERIA | MULTIPLEXING METHOD IN ADVANTAGE | FDD | E-FDD | TDD |
|---|---|---|---|---|
| GUARD BAND | E-FDD AND TDD | FDD REQUIRES A GUARD BAND TO SEPARATE THE DL AND UL CHANNELS. IN MMDS, TWO RF CHANNELS ARE USED TO SEPARATE THE UL AND DL CHANNELS, WHICH AMOUNT TO A SUBSTANTIAL LOSS IN SPECTRUM. | WILL WORK WITH MINIMAL OR NO GUARD BAND | NO GUARD BANDS ARE REQUIRED. |
| GUARD TIME | E-FDD AND FDD | NO GUARD TIME IS REQUIRED AT THE END OF DL TRANSMISSION. HOWEVER, GUARD TIME IS REQUIRED AT THE END OF UL TRANSMISSION BECAUSE TYPICALLY THE SUs ARE HFDD UNITS THAT NEED TO TURN AROUND FROM Tx TO Rx TO RECEIVE THE NEW BSU SCHEDULE INFORMATION FOR THE NEXT DOWNLINK. | SAME AS FDD | GUARD TIME IS REQUIRED BETWEEN Tx AND Rx AND VICE VERSA. THE GUARD TIME IS EQUAL TO A UNIT'S TURN AROUND TIME PLUS THE ROUND TRIP DELAY. A UNIT'S TURN AROUND TIME IS IN THE ORDER OF 50 US. THE ROUND TRIP DELAY IS IN THE ORDER OF 66 US. THUS THE ROUND TRIP DELAY CAN ABSORB THE TRANSMITTER'S TURN AROUND TIME WHENEVER THE DIRECTION OF TRAFFIC SWITCHES. THE LOSS IN THE THROUGHPUT DUE TO GUARD TIME FOR A 5ms FRAME IS ABOUT 2%. |

| | | | |
|---|---|---|---|
| FREQUENCY PLAN AND REUSE | E-FDD AND FDD | THE ADJACENT CHANNEL INTERFERENCE IS MUCH LOWER THAN IN A TDD SCHEME | SAME AS FDD; DYNAMIC SWAPPING OF UL/DL SPECTRUM CAN HELP FURTHER | FREQUENCY PLANNING IS REQUIRED ONLY FOR ONE CHANNEL. IF ALL TDD-BASED SYSTEMS ARE SYNCHRONIZED TO GPS, USING THE SAME FRAME SIZE AND DL/UL PARTITIONING CAN MITIGATE INTERFERENCE. |
| HARDWARE COST | TDD | FDD REQUIRES ONE TRANSMITTER AND A SEPARATE RECEIVER. FURTHER A DIPLEXER AND SHIELDS ARE REQUIRED TO ISOLATE THE DL AND UL. | SAME AS FDD; BUT RF COST (DUPLEXER, ETC) WILL BE SIGNIFICANTLY MINIMIZED IN FUTURE | AS THE TRANSMITTER AND RECEIVER USE THE SAME FILTERS, MIXERS ETC. THE COST OF A TDD SCHEME IS SUBSTANTIALLY LESS THAN AN FDD SCHEME. |
| DYNAMIC BANDWIDTH ALLOCATION | E-FDD AND TDD | ONCE THE CHANNEL BANDWIDTH IS GRANTED BY THE REGULATOR THE UL/DL ALLOCATION CANNOT BE MODIFIED. THIS LEADS TO UNUSED SPECTRUM FOR ASYMMETRIC OPERATIONS SUCH AS INTERNET TRAFFIC. | DYNAMIC ASYMMETRIC UL/DL BW ALLOCATION IS ON THE MAIN FEATURES OF E-FDD | WHERE CELL INTERFERENCE IS NOT A PROBLEM, ADAPTIVE UL/DL ALLOCATION ALLOWS DYNAMIC BANDWIDTH ALLOCATION FOR UL AND DL TRAFFIC. THIS IS ESPECIALLY IMPORTANT FOR INTERNET TRAFFIC. |

| | E-FDD AND FDD | | E-FDD AND TDD | |
|---|---|---|---|---|
| LATENCY | THE AVERAGE FDD LATENCY IS A PMP SYSTEM IS 1 FRAME AND THE BEST CASE LATENCY IS ABOUT 0.5 FRAME. | SAME AS FDD | THE AVERAGE TDD LATENCY IN A PMP SYSTEM IS 2 FRAMES AND THE BEST CASE LATENCY IS ABOUT 1 FRAME. | |
| ADAPTIVE ANTENNA SYSTEM/ MULTIPLE INPUT-MULTIPLE OUTPUT (AAS/MIMO) ADVANTAGES | FOR CLOSED LOOP BEAM FORMING, FDD REQUIRES THE SD TO PROVIDE THE CHANNEL RESPONSE FOR THE DL DIRECTION. THIS INCREASES THE LATENCY AND REDUCES THE PERFORMANCE OF THE BEAM FORMER. | PERIODIC SWAPPING OF UL/DL SPECTRUM CAN ALLOW BSU TO MEASURE CHANNEL ON BOTH UL AND DL THIS ELIMINATING FEEDBACK AND ASSOCIATED LATENCIES. | TDD ALLOWS THE BSU TO ESTIMATE THE DL CHANNEL AS BOTH DL AND UL ARE OPERATING ON THE SAME FREQUENCY. THE PERFORMANCE OF THE BEAM FORMER IS THEREFORE BETTER. | |

FIG. 21C

METHOD AND APPARATUS FOR DYNAMIC BANDWIDTH PROVISIONING IN FREQUENCY DIVISION DUPLEX SYSTEMS

CROSS REFERENCE TO RELATED APPLICATIONS

This application claims the benefit of U.S. provisional application No. 61/383,181, filed Sep. 15, 2010, the contents of which are hereby incorporated by reference herein.

TECHNICAL FIELD

This application is related to wireless communications.

BACKGROUND

With the ever increasing demand for higher bandwidths, there is an immediate need to provide larger chunks of spectrum to each user to enable convergence of various services and simultaneous use of spectrum by multiple users. Traditionally, spectrum has been statically allocated to licensed operators. Users served by the licensed operators are provided small resource blocks in time and frequency. This scheme may not provide high data rates in the order of 100s of Mbps or Gbps to multiple users simultaneously.

One of the basic problems of systems today is to let a number of devices share a common resource, i.e., the allocated spectrum, in an efficient manner so as to simultaneously meet all desired performance objectives, such as fairness, low latency, high throughput, spectral efficiency, reasonable overhead, high mobility, fast scheduling and stability.

SUMMARY

A method and apparatus are described that provides flexible spectrum usage by using a paired frequency division duplex (FDD) spectrum to enable dynamic access in television white space (TVWS), sub-leased spectrum or unlicensed spectrum, (e.g., industrial, scientific and medical (ISM) bands), in a femto cell environment or the like. Elastic FDD (E-FDD) enables femto cell operation in TVWS, sub-leased spectrum and/or unlicensed spectrum, either simultaneously with licensed spectrum or as an alternate channel to licensed spectrum. E-FDD enables dynamic asymmetric bandwidth allocation for uplink (UL) and downlink (DL) in FDD, and enables variable duplex spacing, (i.e., using FDD with minimum duplex spacing between DL and UL spectrum, or, using hybrid-FDD, (FDD in a time duplexed fashion), when a spectrum gap between the UL and DL spectrum is below a certain minimum threshold. Additionally, the signaling enhancements to implement E-FDD are also provided.

BRIEF DESCRIPTION OF THE DRAWINGS

A more detailed understanding may be had from the following description, given by way of example in conjunction with the accompanying drawings wherein:

FIGS. 18A and 18B show an example table that indicates parameters that need to be signaling during system acquisition in current femto systems to enable E-FDD;

FIGS. 21A, 21B and 21C show an example table comparing traditional FDD and time division duplex with E-FDD.

DETAILED DESCRIPTION

Figure 1A:
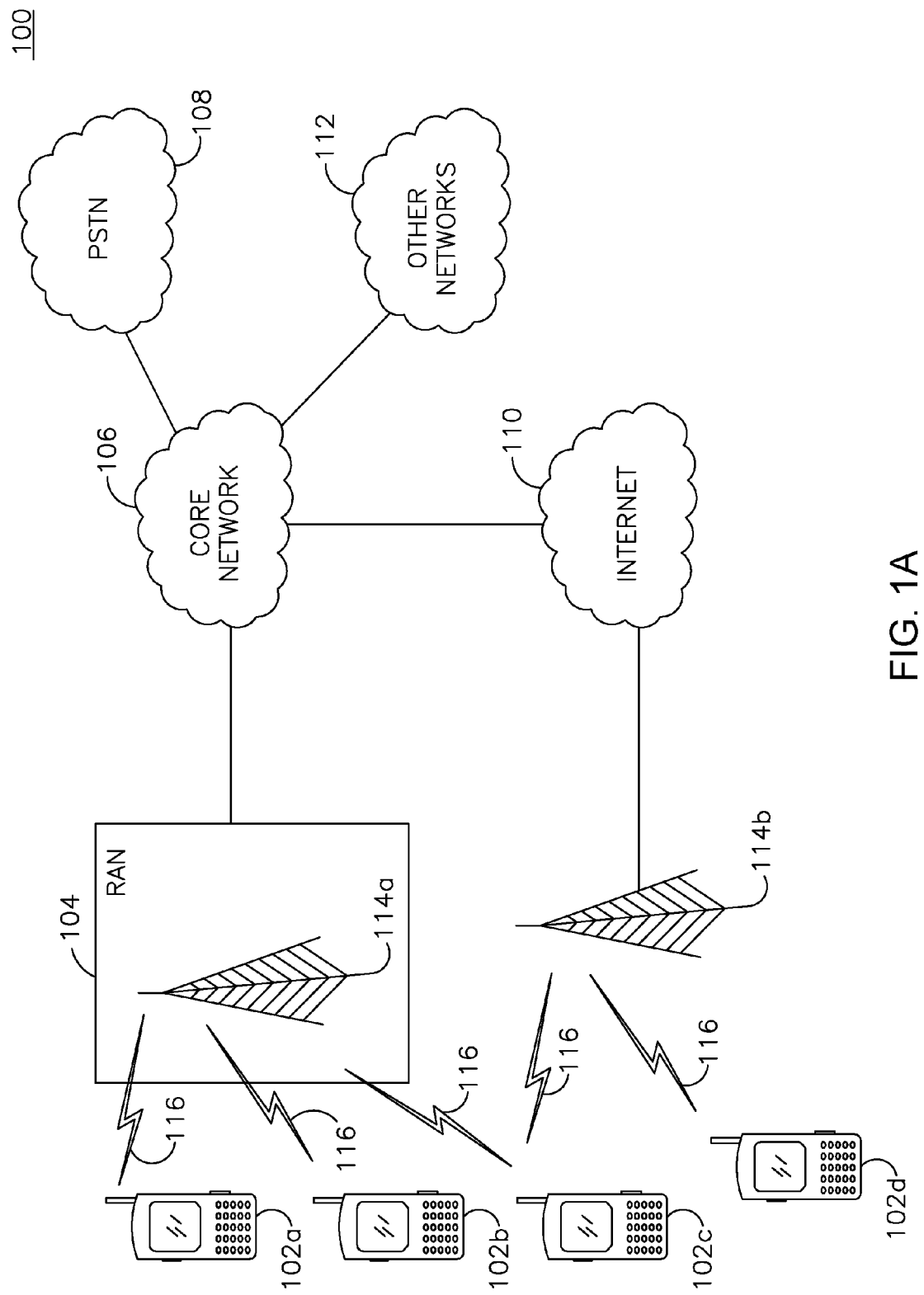
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications system 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102A, 102B, 102C, 102D, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102A, 102B, 102C, 102D may be any type of device configured to operate and/or communicate in a wireless environment. By way of example, the WTRUs 102A, 102B, 102C, 102D may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications system 100 may also include a base station 114A and a base station 114B. Each of the base stations 114A, 114B may be any type of device configured to wirelessly interface with at least one of the WTRUs 102A, 102B, 102C, 102D to facilitate access to one or more communication networks, such as the core network 106, the Internet 110, and/or the networks 112. By way of example, the base stations 114A, 114B may be a base transceiver station (BTS), a Node-B, an eNodeB, a Home Node-B, a Home eNodeB, a site controller, an access point (AP), a wireless router, and the like. While the base stations 114A, 114B are each depicted as a single element, it will be appreciated that the base stations 114A, 114B may include any number of interconnected base stations and/or network elements.

The base station 114A may be part of the RAN 104, which may also include other base stations and/or network elements (not shown), such as a base station controller (BSC), a radio network controller (RNC), relay nodes, etc. The base station 114A and/or the base station 114B may be configured to transmit and/or receive wireless signals within a particular geographic region, which may be referred to as a cell (not shown). The cell may further be divided into cell sectors. For example, the cell associated with the base station 114A may be divided into three sectors. Thus, in one embodiment, the base station 114A may include three transceivers, i.e., one for each sector of the cell. In another embodiment, the base station 114A may employ multiple-input multiple output (MIMO) technology and, therefore, may utilize multiple transceivers for each sector of the cell.

The base stations 114A, 114B may communicate with one or more of the WTRUs 102A, 102B, 102C, 102D over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114A in the RAN 104 and the WTRUs 102A, 102B, 102C may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed DL Packet Access (HSDPA) and/or High-Speed UL Packet Access (HSUPA).

In another embodiment, the base station 114A and the WTRUs 102A, 102B, 102C may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114A and the WTRUs 102A, 102B, 102C may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114B in FIG. 1A may be a wireless router, Home Node-B, Home eNodeB, or access point, for example, and may utilize any suitable RAT for facilitating wireless connectivity in a localized area, such as a place of business, a home, a vehicle, a campus, and the like. In one embodiment, the base station 114B and the WTRUs 102C, 102D may implement a radio technology such as IEEE 802.11 to establish a wireless local area network (WLAN). In another embodiment, the base station 114B and the WTRUs 102C, 102D may implement a radio technology such as IEEE 802.15 to establish a wireless personal area network (WPAN). In yet another embodiment, the base station 114B and the WTRUs 102C, 102D may utilize a cellular-based RAT (e.g., WCDMA, CDMA2000, GSM, LTE, LTE-A, etc.) to establish a picocell or femto cell. As shown in FIG. 1A, the base station 114B may have a direct connection to the Internet 110. Thus, the base station 114B may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102A, 102B, 102C, 102D. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102A, 102B, 102C, 102D to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102A, 102B, 102C, 102D in the communications system 100 may include multi-mode capabilities, i.e., the WTRUs 102A, 102B, 102C, 102D may include multiple transceivers for communicating with different wireless networks over different wireless links. For example, the WTRU 102C shown in FIG. 1A may be configured to communicate with the base station 114A, which may employ a cellular-based radio technology, and with the base station 114B, which may employ an IEEE 802 radio technology.

Figure 1B:
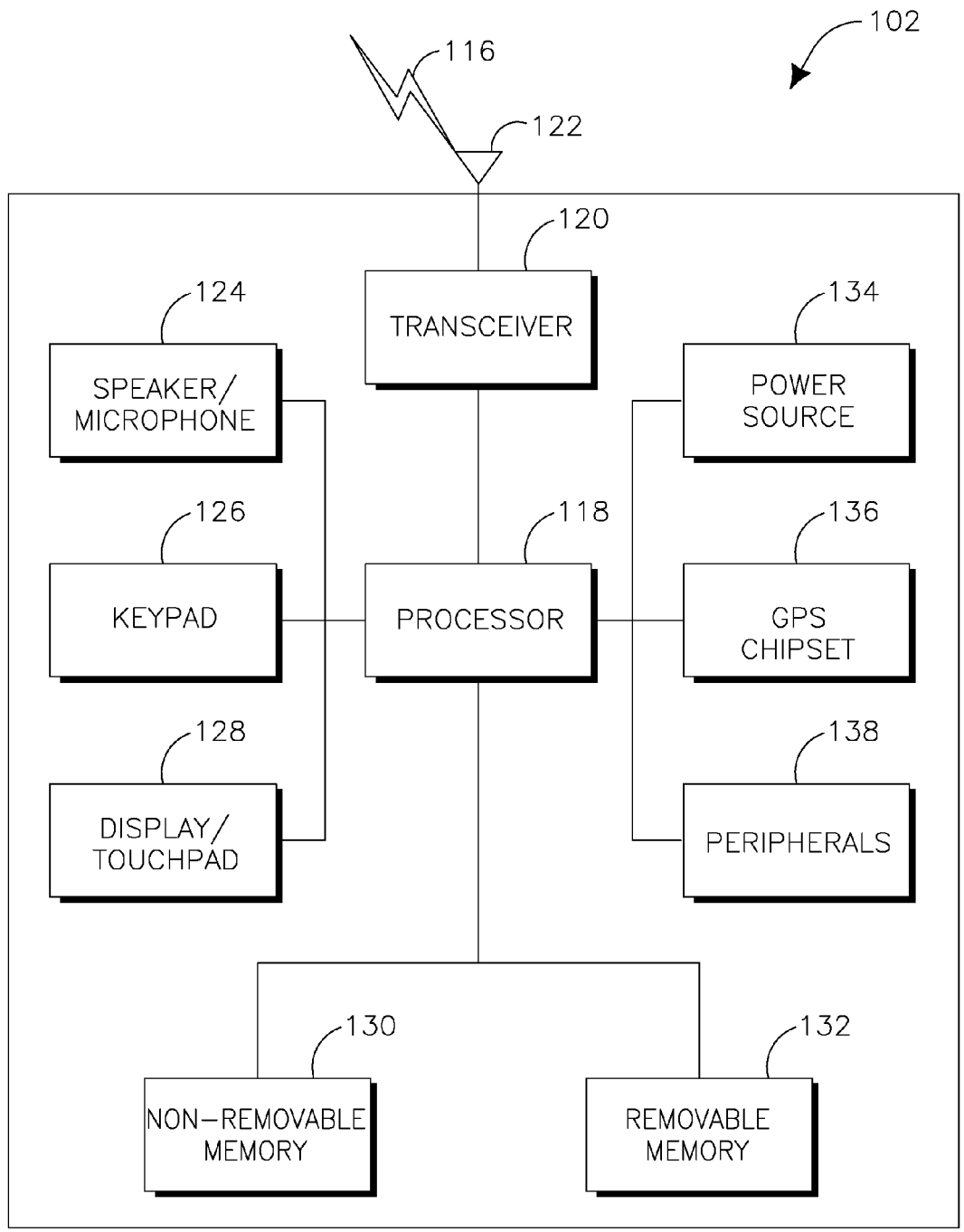
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, a non-removable memory 130, a removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114A) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity (ID) module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114A, 114B) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
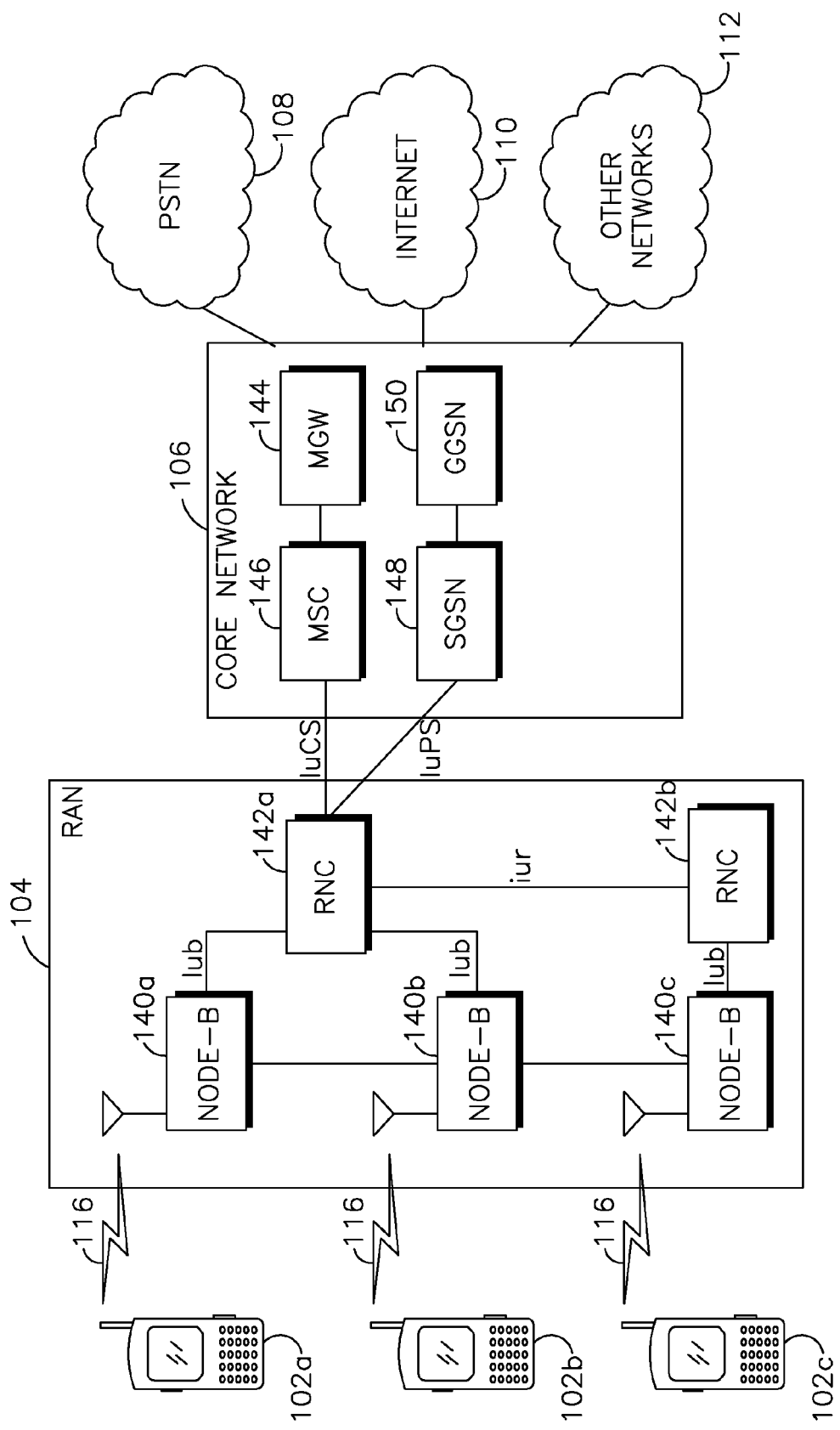
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ a UTRA radio technology to communicate with the WTRUs 102a, 102b, 102c over the air interface 116. The RAN 104 may also be in communication with the core network 106. As shown in FIG. 1C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Spectrum pooling or aggregation across different contiguous or non-contiguous bands using a single carrier or multiple carriers may be needed for efficient use of spectrum resources. Each user may be allocated different time and frequency resource blocks on various bands across various carriers, and provide the necessary bandwidth to achieve the required quality of service (QoS) by each user. The various bands across different carriers may be licensed bands, unlicensed bands, sub-leased bands, or whitespace bands.

To achieve this kind of on-demand resource allocation across a wide spectrum range inclusive of licensed, unlicensed, sub-leased or whitespace spectrum, there is a need to provide knowledge of the Federal Communications Commission (FCC) static spectrum allocation pattern and instantaneous spectrum occupancy patterns of unlicensed bands, as well as recently opened licensed television (TV) bands to the user's handset/modem and the access point/gateways. Using this knowledge, the system may then make instantaneous decisions to access a particular band outside of the licensed cellular spectrum for active communication.

Uplink (UL) and downlink (DL) spectra allocation in a traditional frequency division duplex (FDD) licensed cellular spectrum is symmetrical and static. However, spectrum usage in the UL and DL is generally asymmetric due to constantly changing usage patterns/traffic demands, (i.e., FDD), and may have a lightly loaded spectrum in one direction, (e.g., UL), while a bottleneck in the other (e.g., DL). For example, this may occur in a femto cell environment where many users/devices access the same spectrum simultaneously and may have high bandwidth requirements. Thus, a fixed/static FDD spectrum allocation is spectrally inefficient and could give rise to bandwidth bottlenecks.

Interference problems may also be encountered between macro cell and femto cell environments due to the fact that they both operate on the same spectrum band. There may be two possible ways of overcoming loss in overall throughput/performance due the interference. One way is to enable aggregation of bandwidth between licensed spectrum bands and other spectrums like TV bands or unlicensed bands. The other way is to hop from the licensed band to another band like TV bands, sub-leased bands or unlicensed bands, such as industrial, scientific and medical (ISM) bands.

Furthermore, if the cellular operators decide to allow operation in TV white space (TVWS) spectrum in femto cells, there would be a need to dynamically sense which bands are vacant and also to detect the presence of wireless microphones and readjust the spectrum usage in such a way that network operation over the spectrum can still continue by notching out the piece of spectrum being used by the primary incumbents, such as wireless microphones. For a femto cell environment, multiple simultaneous users may cause bandwidth bottlenecks, asymmetric traffic patterns, and varying QoS demands in the UL and DL.

Described herein is a method and apparatus for providing an elastic frequency division duplex (E-FDD) scheme with corresponding signaling enhancements and associated call flows that provide flexible spectrum usage by using a paired FDD spectrum to enable dynamic access in television white space (TVWS), sub-leased spectrum or unlicensed spectrum, (e.g., industrial, scientific and medical (ISM) bands), in a femto cell environment or the like.

Figure 2:
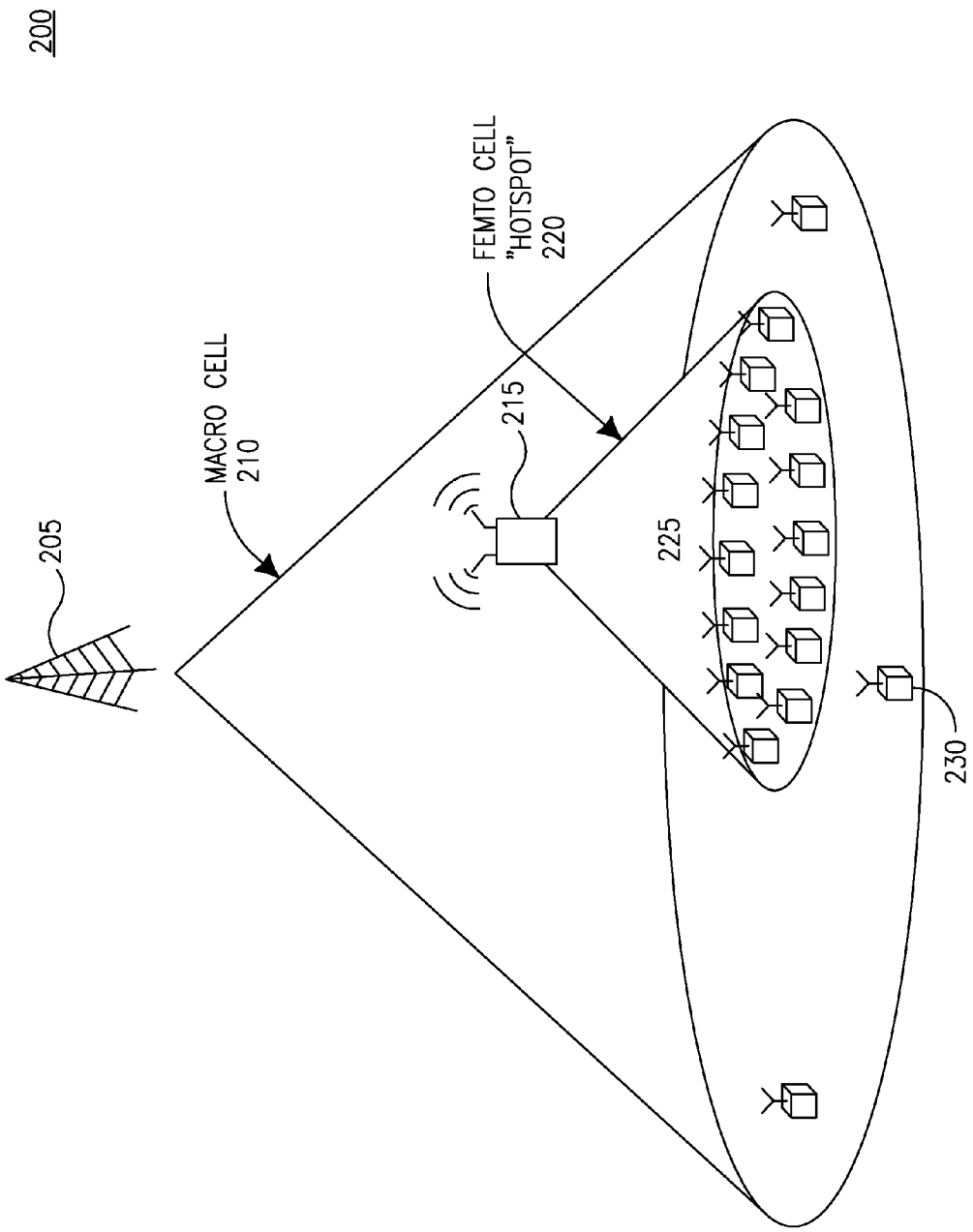
FIG. 2 shows a plurality of wireless transmit/receive units (WTRUs) within a macro cell and a femto cell.

FIG. 2 shows an example coverage scenario 200 where a base station 205 provides macro cell 210 and a home evolved Node-B (HeNB), for example, provides a femto cell 220. A plurality of WTRUs 225 may operate within the macro cell 210 and the femto cell 220 and another plurality of WTRUs 230 may operate within the macro cell 210. In a scenario where the operator in the macro cell 210 uses paired FDD spectrum, the WTRUs 230 may move out of the macro cell 210 and into the femto cell 220 where the density of WTRUs 225 may be high, as in the case of hot spots. Also, the bandwidth requirement for data usage by the WTRUs 225 may be high, in addition to the fact that there may be more than one WTRU 225 in the femto cell 215 with high bandwidth (BW)/QoS requirements. The licensed spectrum over which the femto cell 225 may be operating may quickly run out of resources to support multiple high bandwidth links. Therefore, femto cells may need to operate in bands outside of licensed cellular spectrum like TVWS bands, ISM bands, and the like. This would permit the other spectrum to be used simultaneously with the licensed spectrum in bandwidth aggregation schemes or the other spectrum may be used as an alternate spectrum to jump over to when macro-femto interference is high.

Figure 3:
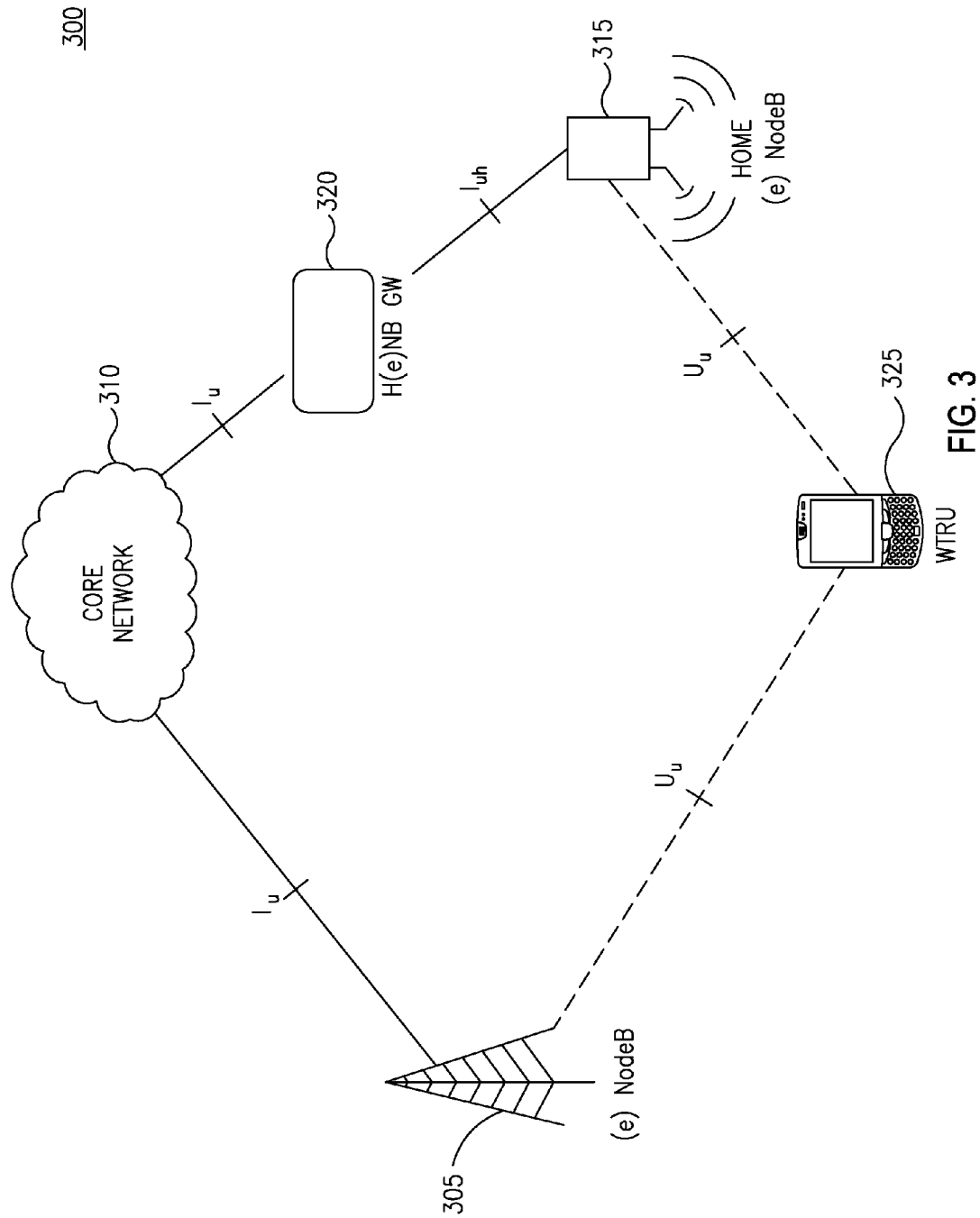
FIG. 3 shows an example architecture of a macro evolved Node-B (eNodeB) and a home evolved Node-B (HeNB)

FIG. 3 shows an example overall architecture 300 of an evolved Node-B (eNodeB) 305 connected to or in communication with a core network 310 and a home evolved Node-B (H(e)NB) 315 connected to or in communication with the core network 310 via an H(e)NB gateway 320. A WTRU 325 may be connected to or in communication with the eNodeB 305 and/or the H(e)NB 315. The above architecture 300 is one example of an architecture that may be used in conjunction with E-FDD as described herein.

Figure 4:
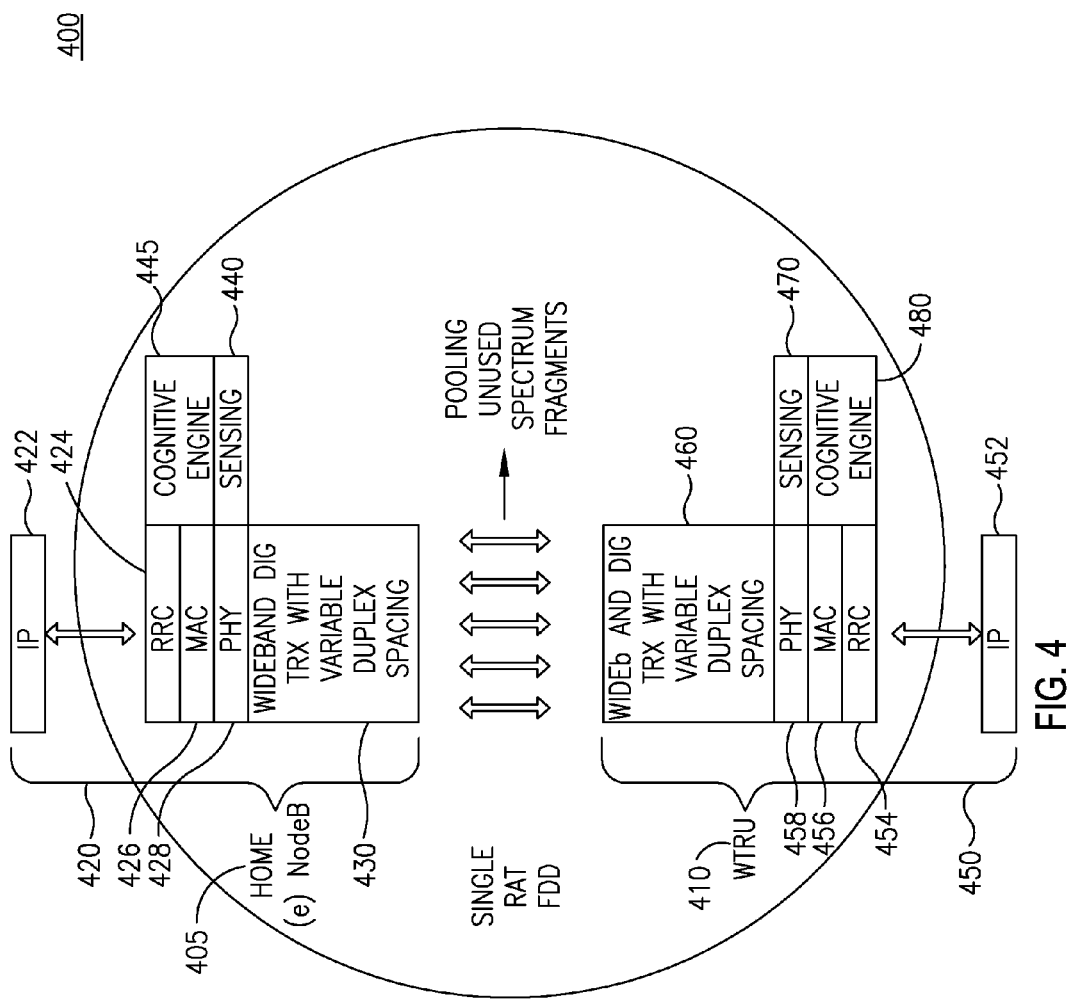
FIG. 4 shows an example high-level architecture for a scenario where a HeNB and a WTRU communicate over a single radio access technology (RAT) using an FDD duplex scheme.

FIG. 4 shows an example system 400 of an H(e)NB 405 and a WTRU 410 communicating with each other over a single radio access technology (RAT) using an E-FDD duplex scheme. In general, the H(e)NB 405 may have a protocol stack 420 including an Internet Protocol entity 422, a radio resource controller (RRC) 424, a medium access controller 426, and a physical entity 428. The protocol stack 420 may operate with a wideband digital transceiver 430 that may have the capability to handle variable duplex spacing, and transmit over multiple spectrum bands simultaneously using a single RAT. The multiple bands, which may be licensed cellular spectrum along with vacant TV bands, sub-leased bands and/or other unlicensed bands, may be pooled together to provide wide bandwidth for communication. The spectrum fragments from TV bands, sub-leased bands and unlicensed bands are known to be vacant or occupied by accessing a white space database, or may be inferred from a sensing algorithm used to actively sense spectrum occupancy patterns. This may be accomplished using a sensing entity 440. A cognitive policy engine 445 may provide information of the spectrum availability based on information received from the white space database. The WTRU 410 may have a similar arrangement. For example, a protocol stack 450 may include an Internet Protocol entity 452, a radio resource controller 454, a medium access controller 456, and a physical entity 458. The protocol stack 450 may operate with a wideband digital transceiver 460, a sensing entity 470 and a cognitive policy engine 480 as described herein.

Figure 5:
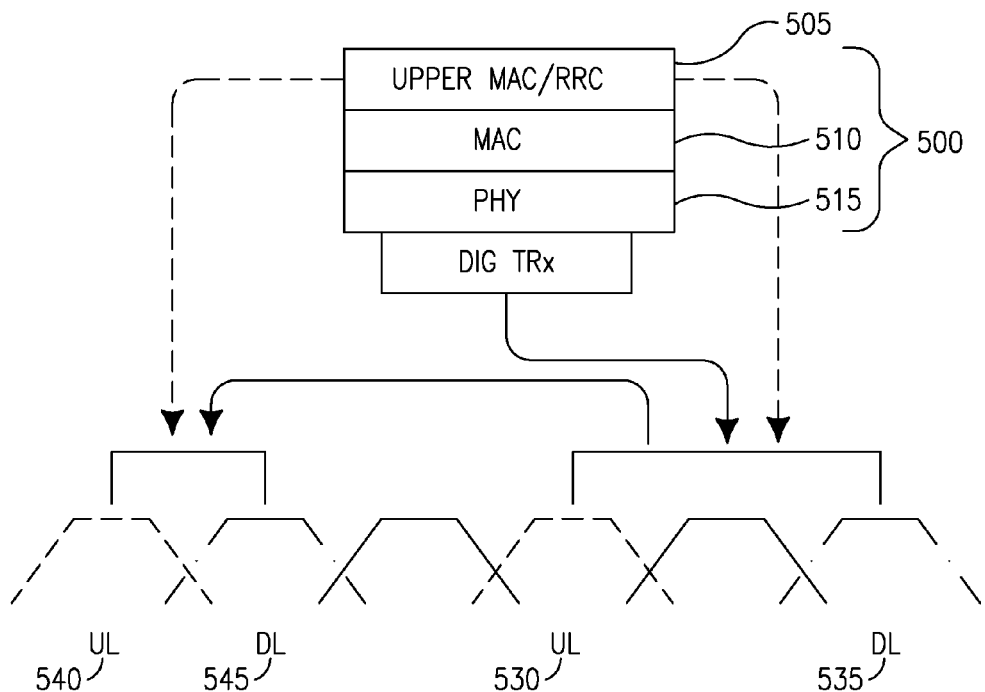
FIG. 5 shows an example of moving uplink (UL) and downlink (DL) FDD bands from high spectrum bands to lower spectrum bands.

FIG. 5 shows an example protocol stack 500 in the H(e)NB and/or the WTRU that may access a wide range of spectrum bands. The protocol stack 500 may include a radio resource controller 505, a medium access controller 510, a physical entity 515 and a wideband digital transceiver 520. The wideband digital transceiver 520 may be implemented as described in U.S. Patent Publication No. 2010/0226330, filed Mar. 3, 2010, the contents of which is hereby incorporated by reference herein. The initial spectrum used by the system may be the licensed FDD paired spectrum used by the network operator. The wideband digital transceiver 520 may be tuned to that spectrum and the devices, the H(e)NB and WTRU, may establish a RCC connection over that spectrum for uninterrupted data transfer. Functionally and/or operationally, an UL FDD band 530 and DL FDD band 535 may be moved from high spectrum bands to lower spectrum bands, such as UL FDD band 540 and DL FDD band 545, using a digital transceiver 515 in a WTRU. When the WTRU decides to hop to the new spectrum, a new RRC connection may be established over the new spectrum bands, and the old RRC connection is torn down. The wideband digital transceiver 520 may then be re-tuned to the new spectrum bands. As described herein, the UL and the DL bands of the FDD spectrum may or may not have sufficient duplex spacing for full duplex transmission at the new spectrum location.

Figure 6:
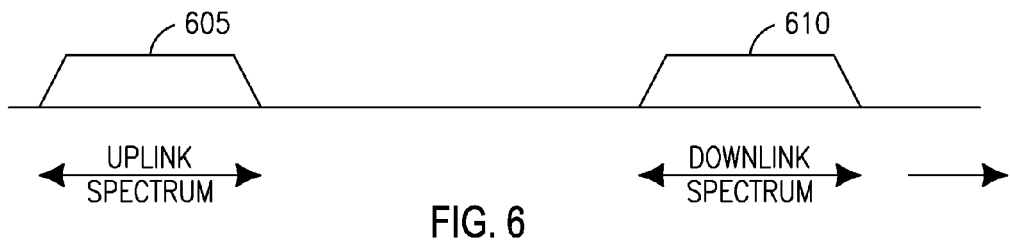
FIG. 6 shows an example licensed spectrum allocation for UL and DL in FDD.

FIG. 6 shows a licensed spectrum allocation for UL spectrum 605 and DL spectrum 610 in FDD. As stated herein above, in the FDD mode of communication, the frequency spectrum bands have been fixed and statically allocated to DL and UL. However, the bandwidth requirement on the UL (DL) may be less than that of the DL (UL). Static allocation of spectrum for a duplex mode of communication may be wasteful of bandwidth. In E-FDD, the bandwidth and the exact spectrum bands and/or subcarriers may be dynamically allocated to the UL and the DL. The spectrum is not statically assigned to the uplink or downlink. Instead a block of vacant spectrum may be freely distributed between the two directions, (i.e., UL and DL), based on instantaneous traffic patterns and bandwidth requirements.

In addition, the spacing between the UL and the DL spectrum may be variable. In FDD, the spacing between UL and DL spectrum may be very large, (in the order of 10s of MHz), to relax the requirement on a radio frequency (RF) duplexer design. This helps in creating adequate amount of isolation between transmit and receive chains in the modem. In E-FDD, the UL and DL may communicate simultaneously, such as in traditional FDD, if the spacing between the UL and DL spectrum is greater than a threshold. However, when the spacing is less than the threshold, a hybrid FDD scheme may be used in order to prevent leakage of a transmit chain signal into the receive chain.

Figure 7:
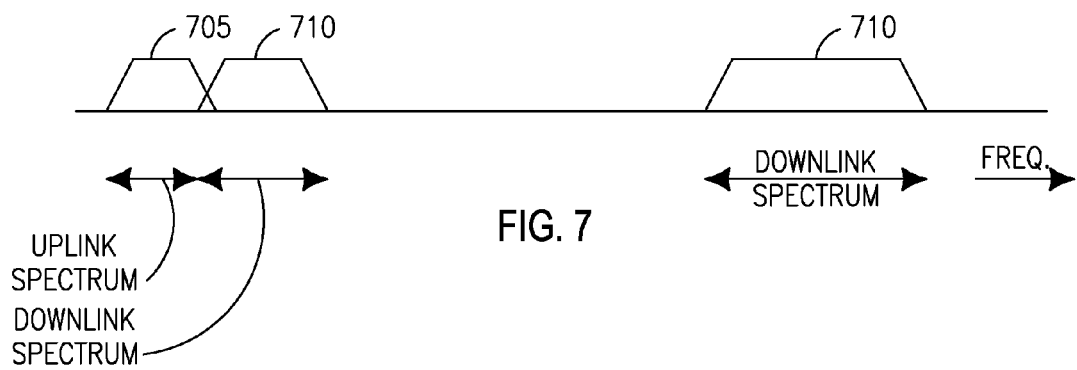
FIG. 7 shows an example asymmetric assignment of UL and DL spectrum using elastic FDD (E-FDD)

In FDD, the UL spectrum may not be as heavily utilized as the DL spectrum. At a minimum, the UL spectrum 705 and DL spectrum 710 and 715 in E-FDD may be asymmetrically distributed in the licensed spectrum based on traffic patterns as shown, for example, in FIG. 7. In other words, the UL spectrum, (as shown as UL spectrum 605 in FIG. 6), may be split such that a part of the spectrum may be utilized for UL communication, (i.e., UL spectrum 705), while the remaining part of the spectrum, (i.e., shown as DL spectrum 710), may be aggregated with the licensed DL spectrum, (i.e., shown as DL spectrum 715), to enhance the capacity in the DL direction. This may require a low-latency and high accurate signaling of the instantaneous spectral allocations in either direction between the two wireless nodes communicating with each other. Based on the ability of E-FDD to aggregate or split spectrum based on usage, leasing of unused spectrum to third parties may be possible.

Figure 8A:
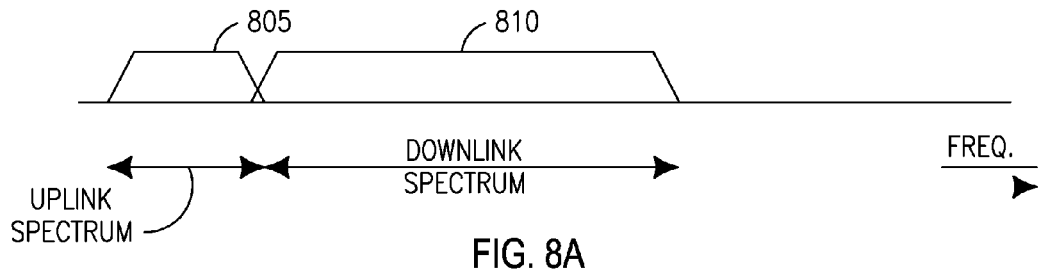
FIGS. 8A, 8B and 8C show an example dynamic allocation for UL and DL spectrum based on a traffic pattern.
Figure 8B:
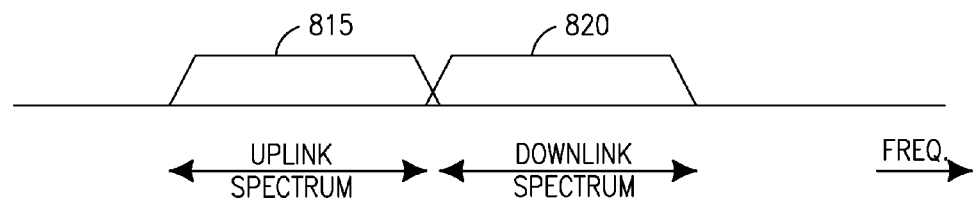
Figure 8C:
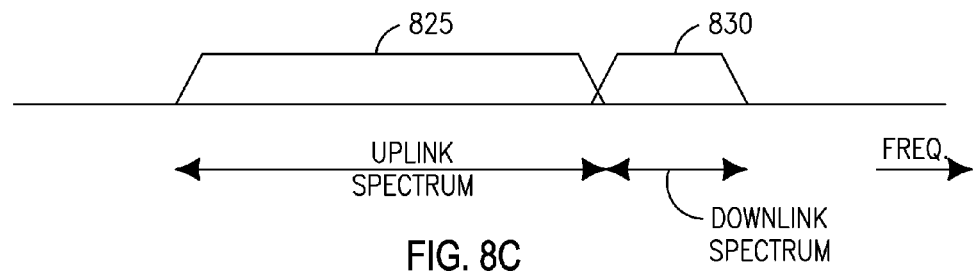

Described herein is spectrum agility for E-FDD. FIGS. 8A-8C show an example dynamic allocation for UL and DL spectrum based on a traffic pattern. In general, a block of spectrum may be utilized for communications in a femto cell. The spectrum may be dynamically assigned by the H(e)NB between the UL and DL based on the instantaneous traffic needs and the uplink spectrum and the downlink spectrum allocations may not be of equal bandwidth. For example, in FIG. 8A, UL spectrum 805 occupies less bandwidth than DL spectrum 810, but in FIG. 8C, the UL spectrum 825 occupies more bandwidth than DL spectrum 830. FIG. 8B is an example of UL spectrum 815 and DL spectrum 820 occupying equal bandwidths.

Figure 9:
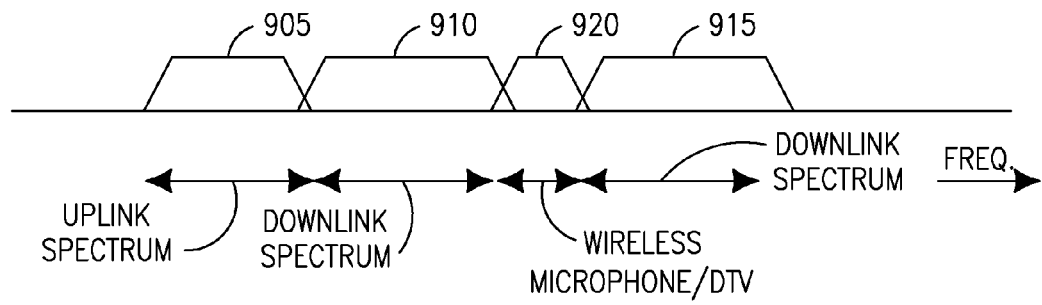
FIG. 9 shows an example dynamic allocation of spectrum in television whitespace (TVWS) in the presence of a wireless microphone.

FIG. 9 shows an example of dynamic allocation of spectrum in TVWS in the presence of a wireless microphone. In existing cellular systems, to operate in TVWS in either time division duplex (TDD) or FDD mode, communication may need to be completely shut off when a primary user such as a wireless microphone is detected. When the H(e)NB operates in TVWS, it has to be aware of the existence of the licensed primary users of the band, such as wireless microphones, and provide uninterrupted access to the spectrum. In this sense, awareness may be achieved using sensing or a centralized database indicating an occupancy pattern of the spectrum. The spectrum usage pattern using E-FDD mode may look like the spectrum shown in FIG. 9 when a wireless microphone is switched on in a particular piece of the spectrum. For example, the spectrum allocation may include an UL spectrum 905, a DL spectrum comprised of DL spectrum 910 and 915 and a primary user spectrum 920 that may be a wireless microphone or digital television (DTV) user. If not for the primary user, the DL spectrum may include DL spectrum 910, DL spectrum 915 and primary user spectrum 920. In E-FDD mode, communication between the H(e)NB and the WTRUs may continue regardless of the presence of the primary user, (i.e., the wireless microphone), and at the same time avoiding interference with the primary user transmission such as a wireless microphone transmission.

Adjacent channel interference between UL and DL spectrum due to small spectrum gap may be mitigated by either using echo-cancellation techniques in FDD mode or by using a hybrid FDD (H-FDD) scheme, where FDD is operated in a time duplexed manner. The H-FDD scheme is favorable to the indoor/home environment where transmit powers are less and thus leakage between transmit and receive chains in the modem may be less. Signaling enhancements may be added to signal the traditional FDD mode or H-FDD mode of operation in the femto cell. Hybrid FDD or half-duplex FDD scheme is a scheme wherein communication on the UL and DL spectrum is in a time multiplexed fashion. The UL and DL spectrum may be non-overlapping and spectrally close to each other, or may be partially overlapping or fully overlapping.

Figure 10:
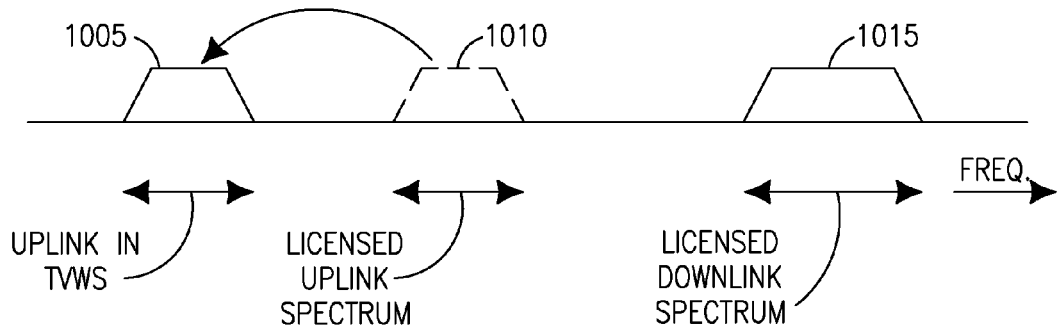
FIG. 10 shows an example of moving only the UL spectrum from a licensed band to a TVWS band.

Alternatively, one band of the licensed paired spectrum, either the UL spectrum or DL spectrum, may be moved to TVWS based on interference issues and/or additional bandwidth requirements. The amount of TVWS required to be used may vary based on QoS requirements, WTRU capability and spectrum availability. For example, FIG. 10 shows an example of moving an UL spectrum 1010 from a licensed band to a TVWS band 1005 and maintaining a DL spectrum 1015 as is.

Figure 11:
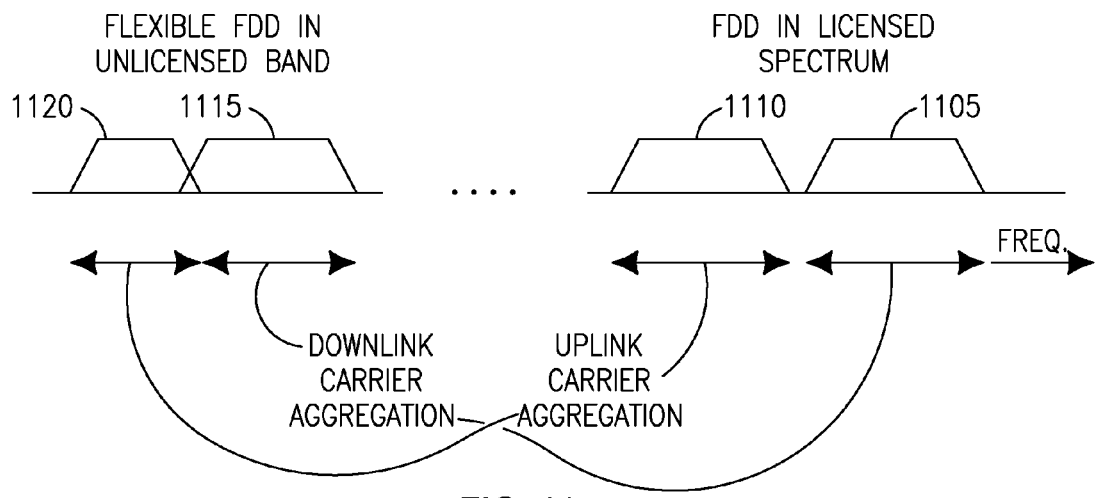
FIG. 11 shows an example of aggregating licensed FDD UL and DL spectrum with a flexible FDD in unlicensed bands.

FIG. 11 shows an example of aggregating licensed FDD UL and DL spectrum with a flexible FDD in TVWS, sub-leased bands or unlicensed bands. In general, a licensed spectrum allocated for FDD may be aggregated with a fragment of unutilized and unlicensed spectrum bands such that a part of the unlicensed spectrum is allocated for uplink and aggregated with licensed uplink spectrum while the remaining part of the unlicensed spectrum is allocated for downlink and aggregated with the licensed downlink spectrum. In particular, a DL licensed spectrum 1105 is carrier aggregated with a DL unlicensed band spectrum 1115 and an UL licensed spectrum 1110 is carrier aggregated with an UL unlicensed band spectrum 1120.

As shown by the examples above, E-FDD provides elastic asymmetric bandwidth provisioning (E-ABP) which adds to the FDD mode, variable/asymmetric bandwidth for UL and DL as described herein above and variable duplex spacing between UL and DL as described herein below. In the latter, when spacing is less than a threshold, a communications mode may switch from FDD to H-FDD.

Described herein is dynamic swapping of UL and DL bands in E-FDD. As the transmitter and the receiver may look at the same wide band, both UL and DL spectra may be allocated within the same wide band without need for different radios for each spectrum. This may provide certain advantages.

First, in the presence of a strong out-of-band interferer close to a receiver, the spectral leakage observed in-band may limit the usefulness of a spectrum fragment spectrally close to the interferer's band. However, the out-of-band leakage observed may be an issue only if the band which is experiencing the leakage is assigned for the WTRU's or H(e)NB's reception. If the band allocation for the UL and DL may be performed intelligently so that the band experiencing the leakage is assigned to the appropriate link (UL or DL) in FDD, the performance impact due to out-of-band leakage may be minimized.

Second, in a multi-antenna adaptive beam forming system, a FDD system may be seen to be less efficient than a TDD system because FDD systems rely on feedback mechanisms between WTRU and the H(e)NB to adjust the beam pattern. However, the feedback latency itself is in the order of a few milli-seconds, which makes the adaptation less efficient. In a TDD system, the channel state feedback, (and thus latency), is eliminated since the channel is reciprocal.

To achieve advantages similar to channel reciprocity in TDD systems, E-FDD may dynamically and periodically swap UL and DL spectra so that both the WTRU and the H(e)NB may estimate the channel on both spectra and thus eliminate the need for channel state feedback, (and associated), latency thus making the adaptive beam forming more efficient in E-FDD systems.

Described herein is variable duplex spacing in E-FDD. In licensed spectrum, the UL and DL spectra are spaced 10s of MHz apart to keep the RF duplexer design simple and cost-effective especially for the WTRU. However, with the wideband digital transceiver, this is not a limitation. The minimum duplex spacing to separate UL and DL spectra may be a function of cell radius, transmitter output power and the receiver sensitivity. The lower the cell radius, the lower the transmit power, and the higher the sensitivity. If the available/vacant spectrum is such that UL and DL spectra may not be separated by more than the minimum duplex spacing, then H-FDD may be used, or FDD may be used but with adaptive interference cancellation techniques to adaptively mitigate interference from the transmit chain into the receive chain. The adaptive interference cancellation technique may be used to mitigate self-interference generated by leakage of a transmitted signal from the transmit front-end into the receive front end and may be implemented as an equalizer using algorithms such as normalized least means square (NLMS), Kalman filtering, and the like. Generally this may be implemented in the digital domain where the self-interference signal experienced by the receiver front-end may be cancelled by tapping the actual transmitted signal and using the tapped transmission signal as a reference signal for the equalization.

Figure 12:
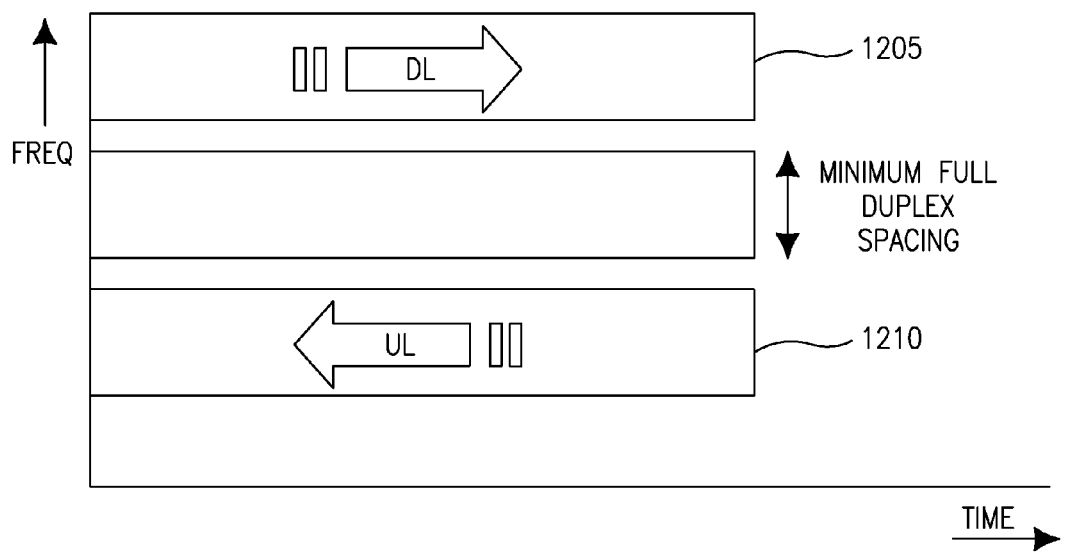
FIG. 12 shows an example full duplex FDD with a DL spectrum band and a UL spectrum band sufficiently separated.
Figure 13:
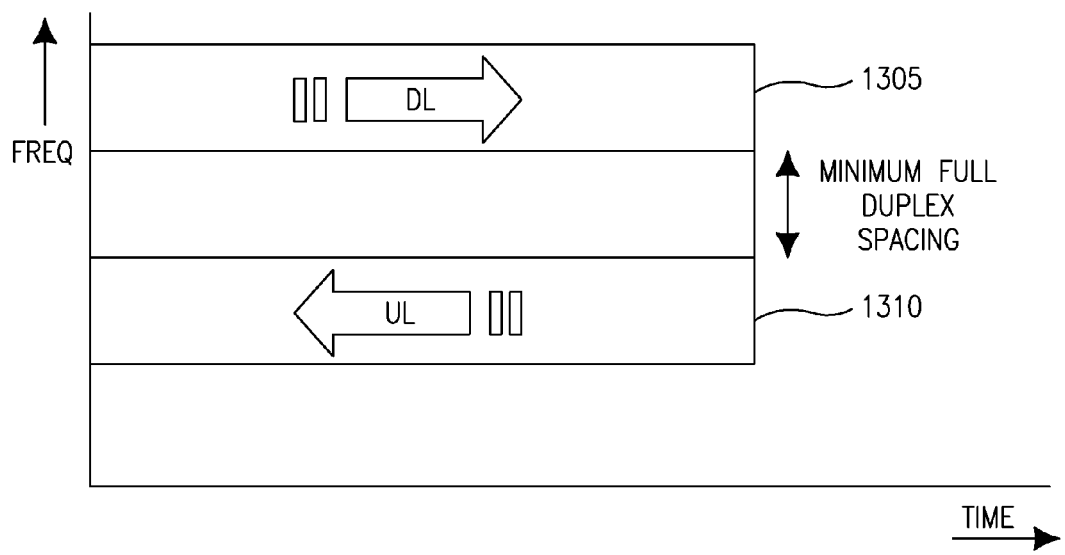
FIG. 13 shows an example full duplex FDD where a DL spectrum band and a UL spectrum band have minimum frequency separation.
Figure 14:
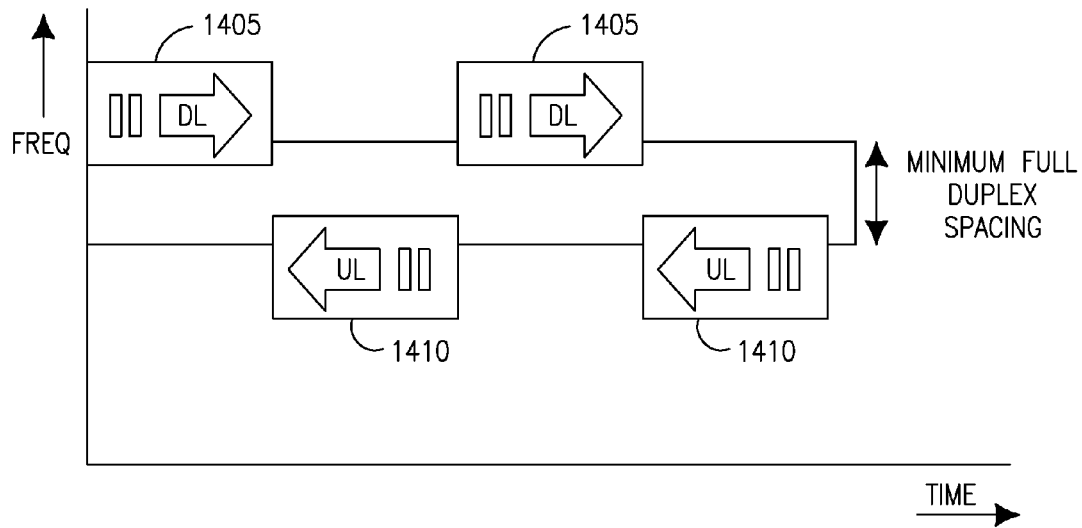
FIG. 14 shows an example half duplex FDD where a DL spectrum band and a UL spectrum band have less than a minimum frequency separation.
Figure 15:
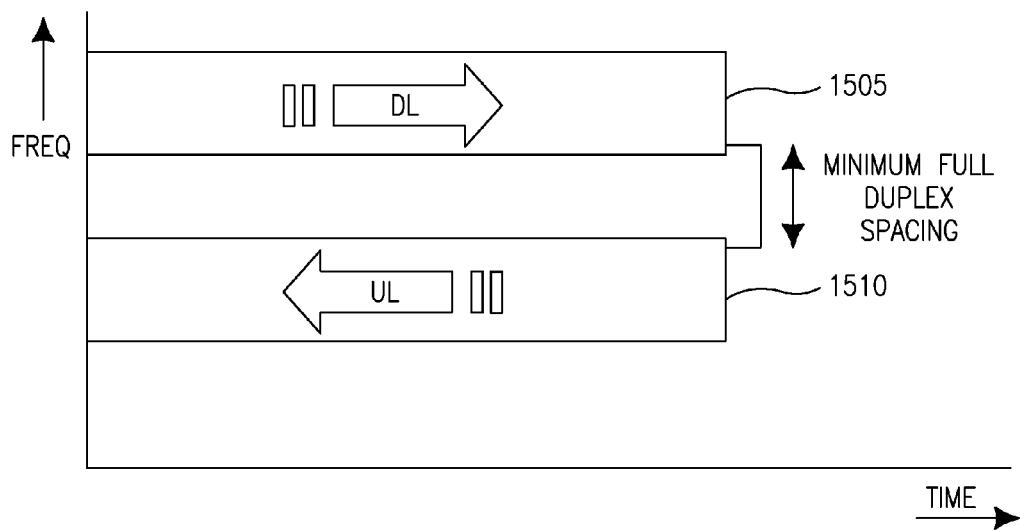
FIG. 15 shows an example full duplex FDD with adaptive interference cancellation.

FIG. 12 shows full duplex FDD with a DL spectrum band 1205 and a UL spectrum band 1210 sufficiently separated to incur no interference. FIG. 13 shows full duplex FDD where a DL spectrum band 1305 and a UL spectrum band 1310 have minimum frequency separation. In this instance H-FDD or adaptive interference cancellation techniques may be used. FIG. 14 shows half duplex FDD where a DL spectrum band 1405 and a UL spectrum band 1410 have less than a minimum frequency separation. FIG. 15 shows full duplex FDD with adaptive interference cancellation. In the latter instance, since the UL 1510 and DL 1505 spectrum are spectrally very close to each other, this causes spectral leakage from the transmit chain into the receive chain in the transceiver. Thus an adaptive self-interference cancellation scheme like NLMS algorithm, Kalman filter, and the like to equalize/cancel the interference within the transceiver may help mitigate the self-interference.

Figure 16:
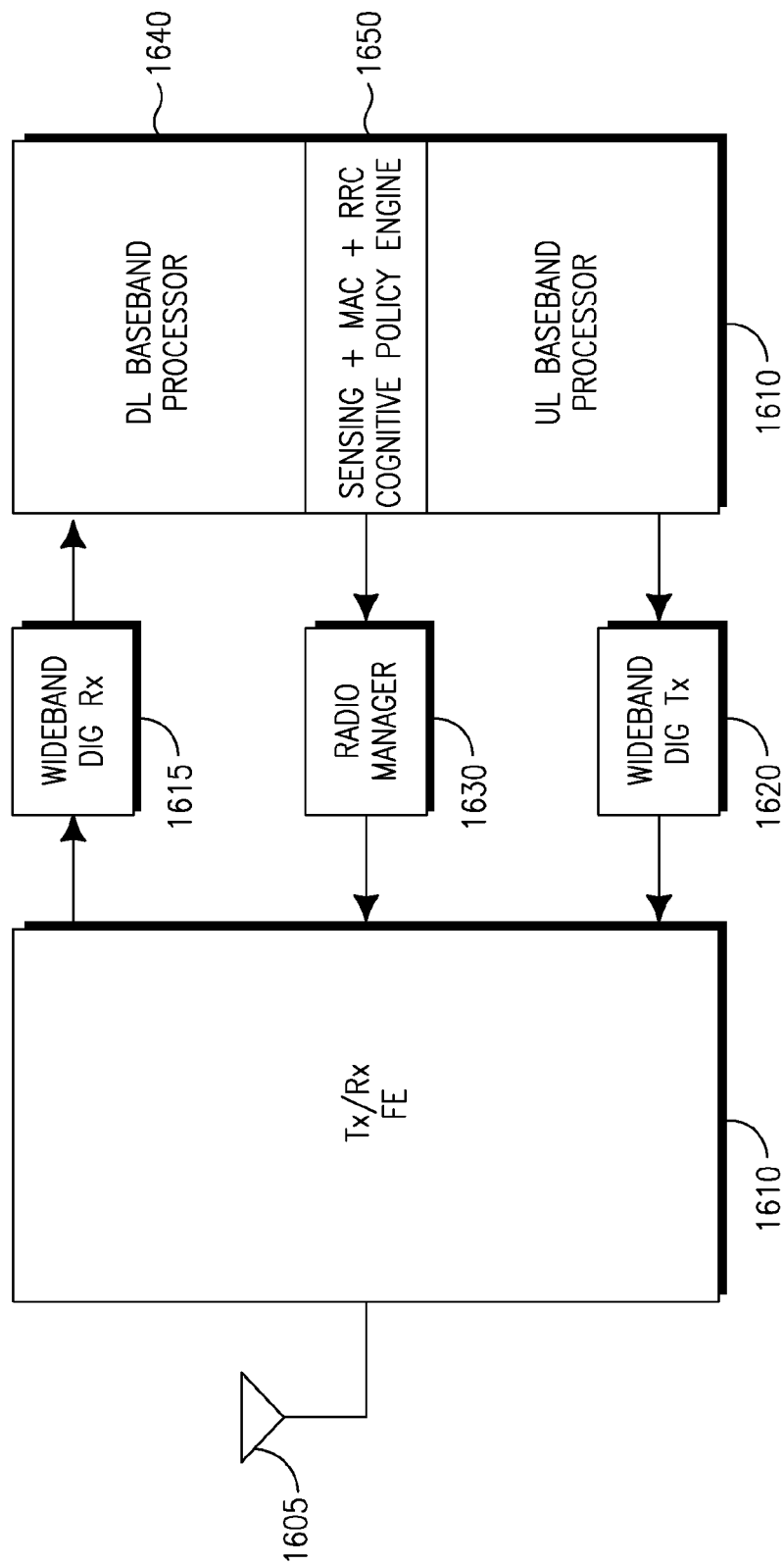
FIG. 16 shows an example high level modem design to support variable duplex FDD.

Described herein is a high level WTRU reference design architecture. FIG. 16 shows an example high level modem 1600 in a WTRU to support variable duplex FDD in E-FDD. The modem 1600 may include an antenna 1605 coupled to or in communication with a transmitter/receiver/transceiver front end 1610. The transmitter/receiver/transceiver front end 1610 is in turn coupled to or in communication with a wideband digital receiver 1615, a wideband digital transmitter 1620 and a radio manager 1630. The wideband digital receiver 1615 and the wideband digital transmitter 1620 may be mixed signal components made of analog and digital parts, one for the transmitter and one for the receiver. The wideband digital receiver 1615 may be connected to or be in communication with DL baseband processor 1640, the wideband digital transmitter 1620 may be connected to or be in communication with an UL baseband processor 1645 and the radio manager 1630 may be connected to or be in communication with control signal processors 1650 including MAC processors, RRC processors, a sensing processor and cognitive policy engine.

Described herein is an example implementation of the wide band digital transceiver. The transceiver may have a single radio chain for all waveform types, support continuous bandwidth aggregation, and also support multiple simultaneous links in single band and network. The power amplifier may support relatively narrowband transmissions, (single or multiple adjacent carriers), and may be placed off-chip. The RF front-end may have a switch-multiplexer for multi-band operation, licensed band/RAT optimized filters, tunable power amplifier output matching network and antenna matching network, and tunable notch filter for reduced WTRU self-jamming.

The transceiver may implement RF functions on digital logic blocks. The operating frequency may range or span TVWS band covering from 512-608 MHz, (also referred to as the low band), and 614-698 MHz, (also referred to as high band), excluding TV channel #37 which spans 608 to 614 MHz. A single board may only cover either a low or high TVWS band at a given time. Two boards may be needed to cover both the low and the high TVWS bands. The channel spacing may be 6 MHz while the channel raster may be 100 kHz. The boards may be programmable as transmitters or receivers in high or low TVWS bands, even in operational mode.

The multiple physical chains may be aggregated and share a single wideband digital transceiver. The mode of operation allows for both TDD and Hybrid FDD although other combinations such as FDD UL and DL may be achieved if two boards are used simultaneously. In FDD operation, full power may be used if each board is configured for different TVWS bands. Backed off power may be used if each board is configured for the same TVWS band by exploiting the antenna separation loss. Synchronization error may be less than ±1 µs between the two boards on the same device. Maximum switching time (i.e., Tx to Rx, Rx to Tx) is 1 usec.

Alternatively, E-FDD may be implemented using a tunable RF front end where the analog filters and duplexers are tunable in terms of their carrier frequency. Bandwidth and duplex spacing between uplink and downlink spectrum and the baseband physical (PHY) algorithms may control these exact parameters on the fly.

Figure 17:
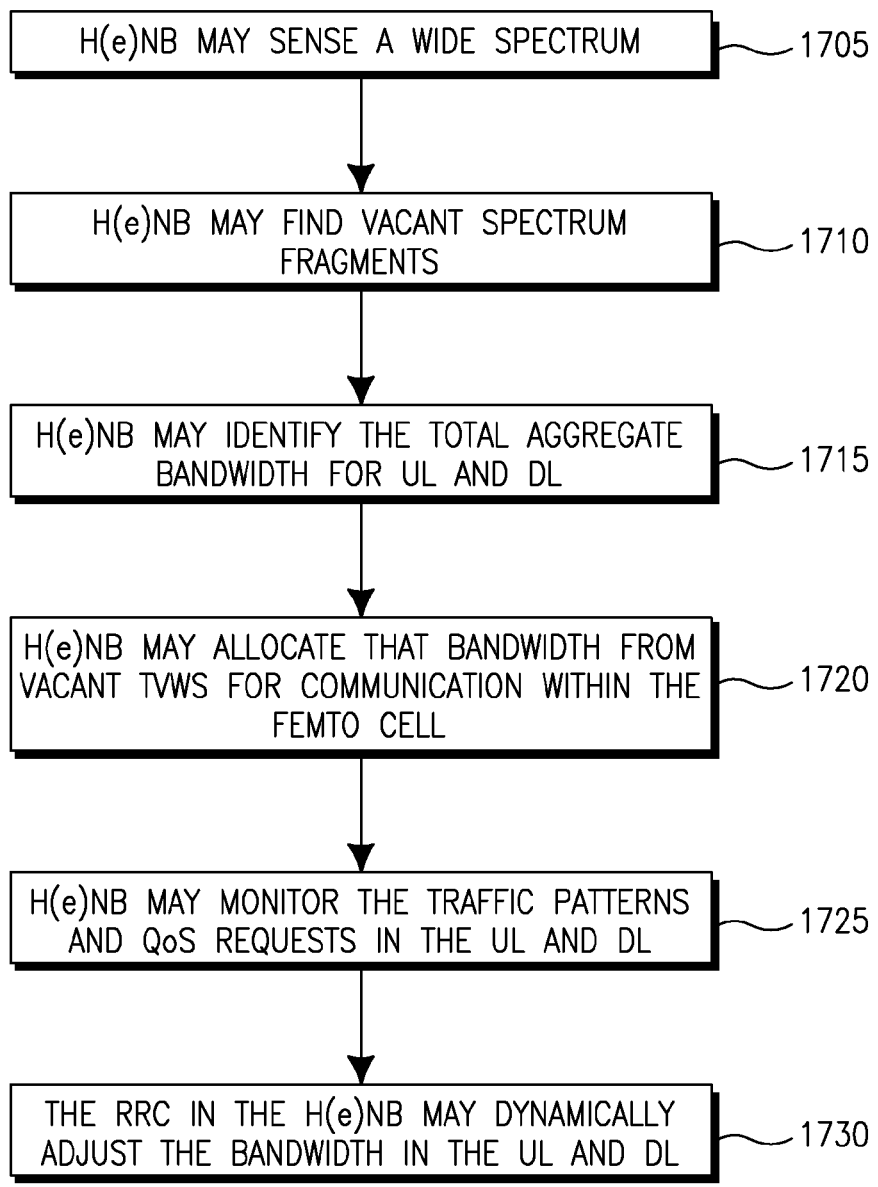
FIG. 17 shows an example flowchart for elastic asymmetric bandwidth provisioning (E-ABP) in elastic FDD (E-FDD)

Described herein is an elastic asymmetric bandwidth provisioning (E-ABP) in E-FDD. In this case, the H(e)NB may operate on TVWS. FIG. 17 shows an example flowchart 1700 for E-ABP. The H(e)NB may sense a wide range of spectrum (1705), find vacant spectrum fragments (1710), identify the total aggregate bandwidth (UL and DL bandwidth) that should be supported by the femto cell (1715) and allocate that bandwidth from vacant TVWS for communication within the femto cell (1720). At start up, the H(e)NB may use a fixed and symmetric assignment of spectrum on either direction. The spectrum for UL and DL may be common, and shared by all users in the network. This may be the default spectrum assignment for the UL and DL, as in the macro cell. As the WTRU moves from the macro cell to the femto cell, the WTRU may connect with the H(e)NB, which constantly monitors the traffic patterns and QoS requests in the UL and DL (1725). The RRC layer at the H(e)NB may keep track of traffic/QoS requirements across the cell and dynamically adjust the bandwidth in the DL and UL, (i.e., it calculates an appropriate ratio of UL bandwidth to DL bandwidth within the fixed total bandwidth to be assigned within the femto cell) (1730).

The instantaneous assignment of uplink and downlink bandwidths and the exact location of white spaces over a wide range of spectrum are signaled during the system acquisition phase. Information about the spectrum assignment is signaled on the system information block (SIB) and master information block (MIB) periodically as described below.

Described herein is cellular system acquisition signaling enhancements for E-FDD. The MIB may carry the DL bandwidth assignment information. For E-FDD, the MIB may need to be modified with information related to DL spectrum allocation map, i.e., a vector of zeros, (indicating occupied fragments), and ones, (indicating vacant fragments), where each zero or one corresponds to the occupancy of a spectrum fragment. The SIB type 2 may carry the UL bandwidth information. For E-FDD, the SIB type 2 may need to be modified with information related to UL spectrum allocation map, i.e., a vector of zeros and ones, as described herein.

FIGS. 18A and 18B show an example table that indicates parameters that may need to be signaled during system acquisition in femto systems to enable E-FDD. The table indicates the message name, description and comments regarding these parameters. The parameters include, for example, Master_Slave_mode, Spectrum_frag_length, DL_freq_start, DL_freq_vector, UL_freq_start, UL_freq_vector, Duplex_mode, DL_hop_aggreg_mode, and UL_hop_aggreg_mode.

Figure 19A:
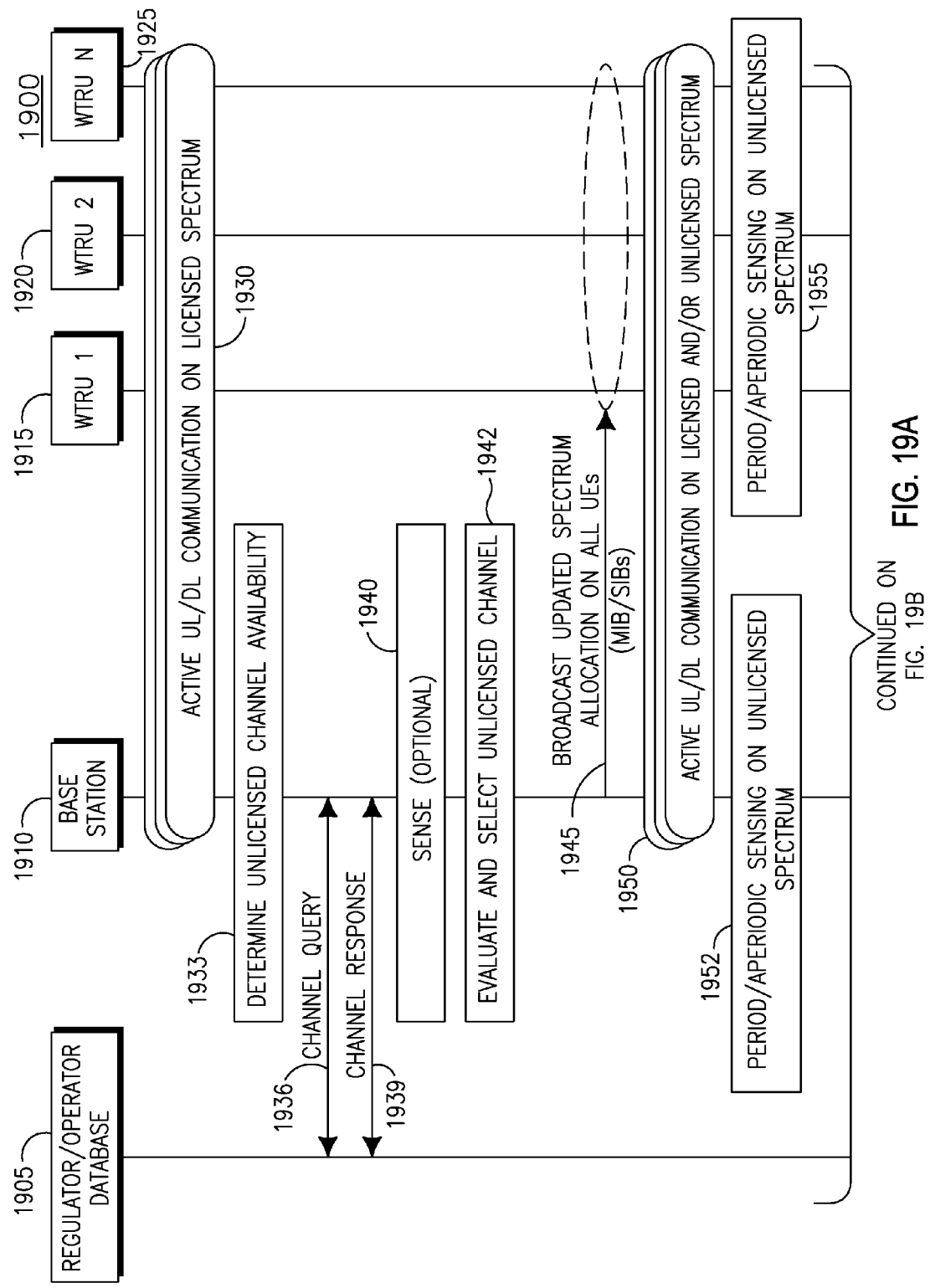
FIGS. 19A and 19B show an example flowchart 1900 for dynamic spectrum allocation for E-FDD.
Figure 19B:
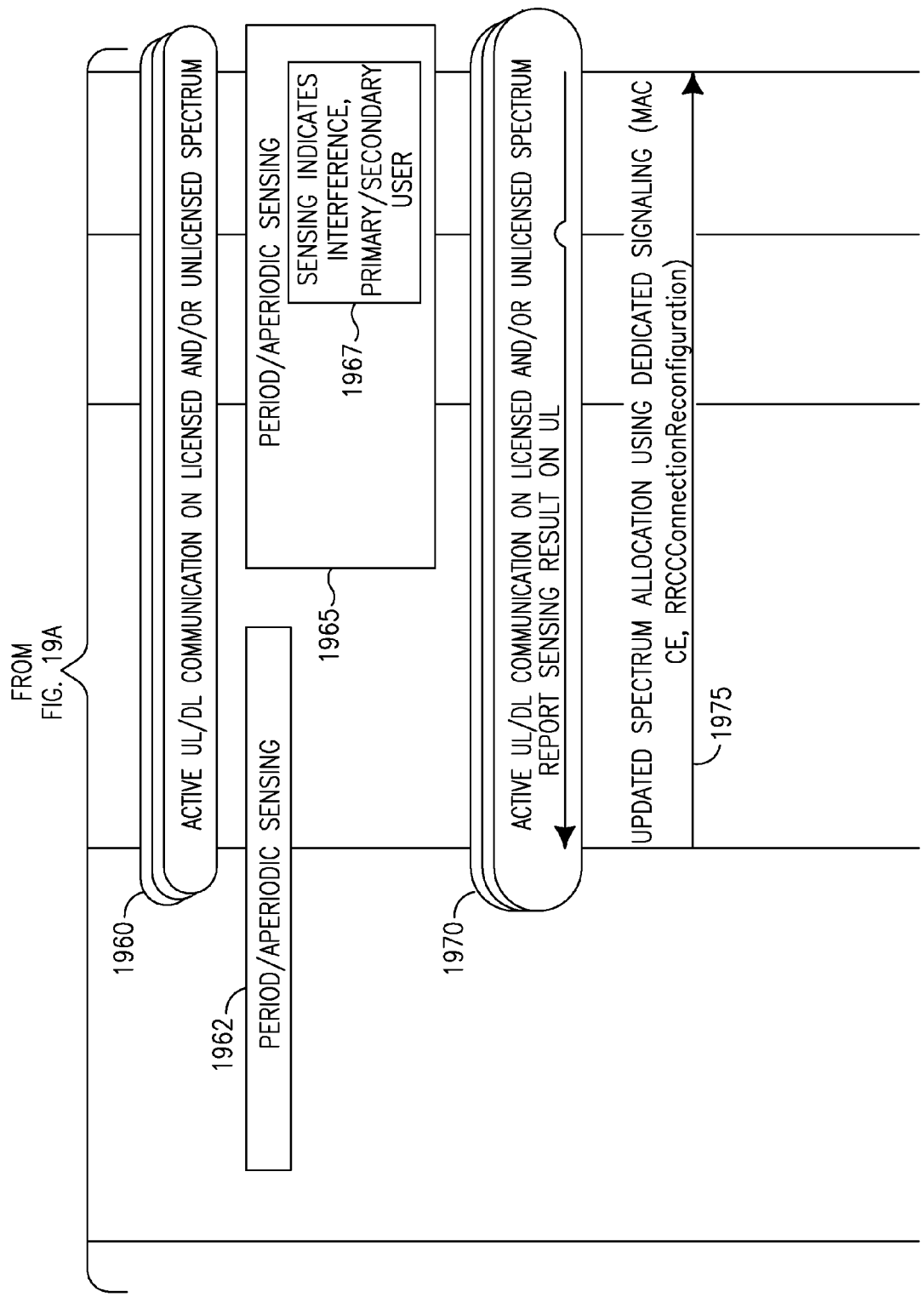

FIG. 19 shows an example flowchart 1900 for dynamic spectrum allocation for a wireless communication system employing E-FDD. The wireless system may include a regulator/operator database 1905, a base station 1910, a WTRU 1 1915, a WTRU 2 1920 and a WTRU N 1930 (collectively "WTRUs"). The regulator/operator database 1905 may be a TVWS database as required by a government agency such as the Federal Communications Commission or it may be an operator specific database like a coexistence database to manage opportunistic use of the spectrum. The base station may be an eNodeB, an H(e)NB, an Access Point and the like. The base station 1910 may be in active UL and DL communication on licensed spectrum with any of the WTRUs (1930). The base station 1910 may determine unlicensed channel availability (1933) and may send a channel query to the regulator/operator database 1905 (1936). The regulator/operator database 1905 may return a channel response to the base station 1910 regarding channel information and availability (1939). The base station may perform a sensing operation to determine channel availability (1940). Based on the channel availability information, the base station 1910 may evaluate and select an unlicensed channel (1942). The selected unlicensed channel may broadcast the updated spectrum allocation on the MIBs and SIBs to any of the WTRUs. The base station 1910 may now be in active UL and DL communication on licensed spectrum and/or unlicensed spectrum with any of the WTRUs. Although the term unlicensed may be used herein, TVWS and/or sub-leased bands may also be used as appropriate.

The base station 1910 and the WTRUs may perform periodic and/or aperiodic sensing on the unlicensed spectrum (1952 and 1955). If no change in conditions, the base station 1910 remains in active UL and DL communication on licensed spectrum and/or unlicensed spectrum with any of the WTRUs. On the next sensing event (1962 and 1965), the sensing at the WTRUs may indicate an interference, a primary/secondary user conflict or the like (1967). A sensing report may be sent on the UL to the base station 1910 by the WTRUs (1970). In response to the sensing report, the base station 1910 may transmit updated spectrum allocation information to the WTRUs using dedicated signaling such as via a MAC control element, a RRCConnectionReconfiguration message or the like (1975).

Figure 20:
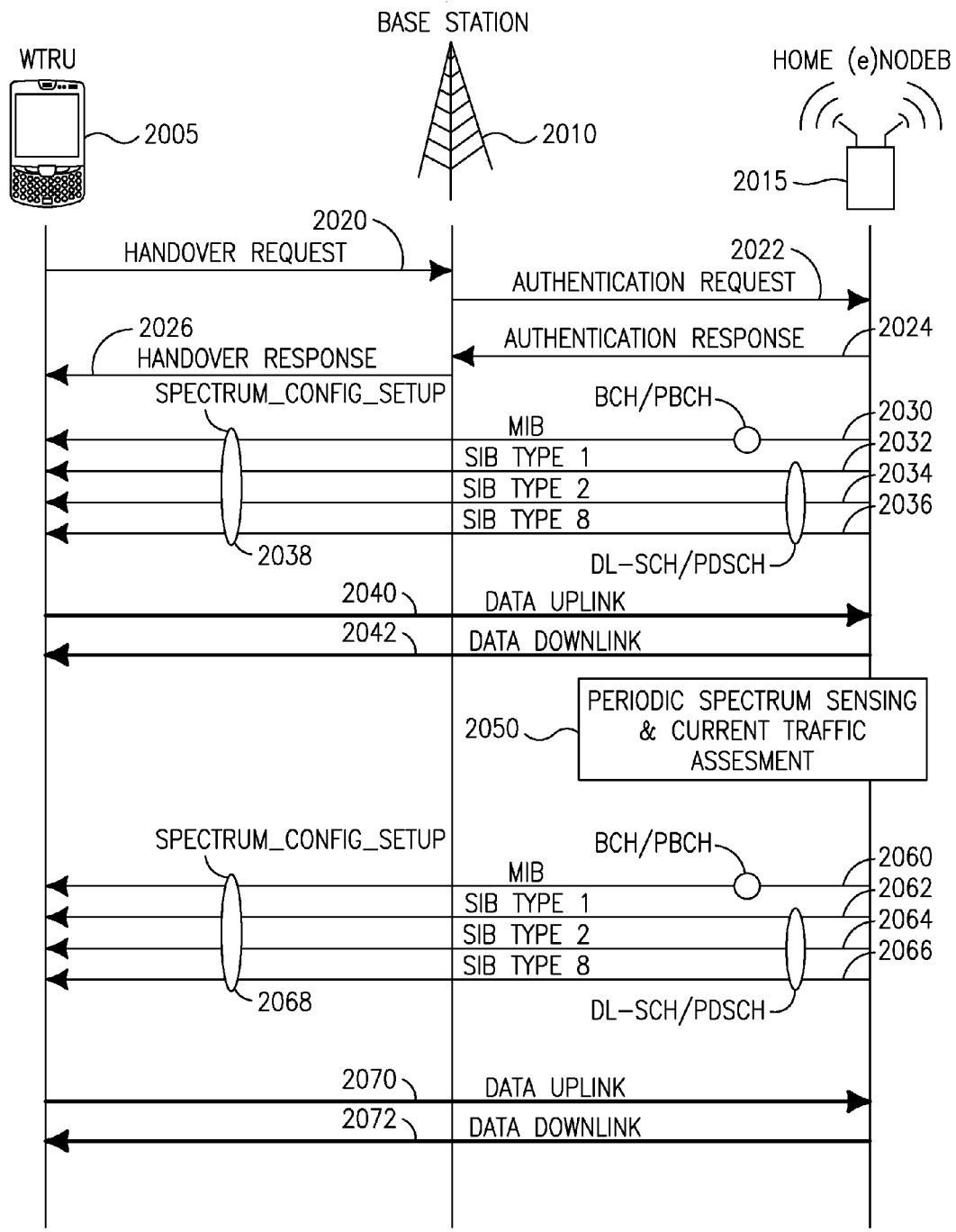
FIG. 20 shows an example call flow to enable elastic-asymmetric bandwidth provisioning (E-ABP) within a cellular network.

FIG. 20 shows a signaling call flow to enable E-ABP within a cellular network including a WTRU 2005, a base station 2010 and an H(e)NB 2015. The WTRU 2005 may transmit a handover request to the base station 2010 (2020), which in turn may transmit an authentication request to the H(e)NB 2015 (2022). The H(e)NB 2015 may then transmit an authentication response to the base station 2010 (2024), which in turn may transmit a handover response to the WTRU 2005 (2026).

A spectrum_config_setup procedure 2038 may be implemented between the H(e)NB 2015 and the WTRU 2005. The H(e)NB 2015 may transmit the MIB over a broadcast channel (BCH)/physical BCH (PBCH) to the WTRU 2005 and may transmit SIB type 1, SIB type 2 through SIB type 8 over a downlink shared channel (DL-SCH)/physical downlink shared channel (PDSCH) (2032, 2034, 2036). The WTRU 2005 may transmit data to the H(e)NB 2015 (2040) and the H(e)NB 2015 may transmit data to the WTRU 2005 (2042). The H(e)NB 2015 may perform a periodic sensing and current traffic assessment procedure (2055). After the periodic spectrum sensing, another spectrum_config_setup procedure (2068) may be implemented between the H(e)NB 2015 and the WTRU 2005 using the information transmitted by the H(e)NB 2015 to the WTRU 2005 (2060, 2062, 2064, 2066). The WTRU 2005 may transmit data to the H(e)NB 2015 (2070) and the H(e)NB 2015 may transmit data to the WTRU 2005 (2072).

FIGS. 21A, 21B and 21C show a table comparing FDD and TDD schemes with the E-FDD scheme. The comparison is based on seven (7) criteria to compare the three schemes. As shown in FIG. 21, the E-FDD scheme out performs in six out of the seven criteria as a multiplexing scheme as compared to FDD and TDD.

In general, a method of frequency division duplexing (FDD) is described herein. The method includes assessing spectrum usage for uplink (UL) and downlink (DL) based on spectrum usage information, determining availability of spectrum and dynamically allocating UL spectrum and the DL spectrum from the spectrum in view of spectrum usage assessment and spectrum availability. The spectrum may be licensed, sub-leased, whitespace or unlicensed spectrum. The spectrum usage information may be traffic patterns, bandwidth requirements or quality of service requirements and the spectrum availability information may be based on sensing or centralized database access.

The spectrum allocation may be asymmetric and the spacing between the UL spectrum and the DL spectrum may be variable. The UL and the DL may communicate simultaneously on a condition that the spacing between the UL spectrum and the DL spectrum is greater than a threshold. Self-interference between a transmit chain and a receive chain due to minimal or no duplex spacing may be mitigated by using one of adaptive cancellation or hybrid FDD (H-FDD). A hybrid FDD scheme may be used to prevent leakage of a transmit chain signal into a receive chain on a condition that spacing between the UL spectrum and the DL spectrum is less than a threshold. Alternatively, an adaptive self-interference cancellation scheme may be used in the radio frequency (RF) front-end at transmitter and receiver to prevent leakage of the transmit chain signal into the receive chain on a condition that spacing between the UL spectrum and the DL spectrum is less than a threshold.

Dynamic allocation of available whitespace spectrum may occur in the presence of a primary user and dynamic allocation of available unlicensed spectrum may occur in the presence of secondary users. In particular, the method further includes detecting the presence of the primary user on the available whitespace spectrum on a condition that the primary user is now using previously available whitespace spectrum, dynamically allocating the UL spectrum and the DL spectrum around the primary user's transmission in the previously available unlicensed spectrum, and maintaining communication between a base station and at least one wireless transmit/receive unit regardless of the presence of the primary user by avoiding interference with the primary user transmission.

The UL spectrum and/or the DL spectrum may be moved to at least one of a sub-leased, whitespace or unlicensed spectrum due to operational conditions, where the UL spectrum and the DL spectrum were using licensed spectrum. Dynamic swapping between the licensed spectrum and at least one of sub-leased, whitespace or unlicensed spectrum may occur. In particular, the method may include determining at least one of sub-leased, whitespace or unlicensed channel availability, selecting at least one of sub-leased, whitespace or unlicensed channel based on bandwidth requirement for the UL and the DL, allocating a selected sub-leased, whitespace or unlicensed channel, and communicating on an allocated sub-leased, whitespace or unlicensed channel and a licensed channel. A portion of the UL spectrum or the DL spectrum may be allocated to the remaining one of the DL spectrum or the UL spectrum, respectively. The licensed spectrum may be aggregated with at least one of sub-leased, whitespace or unlicensed spectrum, where the UL spectrum and the DL spectrum may both include aggregated licensed spectrum and unlicensed spectrum.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method of implementing frequency division duplex (FDD), the method comprising:
assessing spectrum usage for uplink (UL) and downlink (DL) based on spectrum usage information, wherein the spectrum usage information includes quality of service requirements;
determining availability of spectrum based on sensing;
detecting a presence of a primary user on an available whitespace spectrum on a condition that the primary user is using a previously available whitespace spectrum;
dynamically allocating the UL spectrum and the DL spectrum from the spectrum around a transmission by the primary user in a previously available unlicensed spectrum in view of spectrum usage assessment and spectrum availability with a variable spacing between the UL spectrum and the DL spectrum; and
maintaining communication between a base station and at least one wireless transmit/receive unit by avoiding interference with the transmission by the primary user.

2. The method of claim 1, wherein the spectrum is at least one of licensed, sub-leased, whitespace or unlicensed spectrum.

3. The method of claim 1, wherein the spectrum usage information is at least one of traffic patterns or bandwidth requirements.

4. The method of claim 1, wherein spectrum allocation is asymmetric.

5. The method of claim 1, further comprising determining the spacing between the UL spectrum and the DL spectrum as a function of at least one of a cell radius, a transmitter output power, or a receiver sensitivity.

6. The method of claim 1, wherein the UL and the DL communicate simultaneously on a condition that spacing between the UL spectrum and the DL spectrum is greater than a threshold.

7. The method of claim 1, wherein a hybrid FDD scheme is used to prevent leakage of a transmit chain signal into a receive chain on a condition that spacing between the UL spectrum and the DL spectrum is less than a threshold.

8. The method of claim 1, wherein an adaptive self-interference cancellation scheme is used in a radio frequency (RF) front-end at transmitter and receiver to prevent leakage of the transmit chain signal into the receive chain on a condition that spacing between the UL spectrum and the DL spectrum is less than a threshold to enable full duplex FDD.

9. The method of claim 1, wherein dynamic allocation of available unlicensed spectrum occurs in a presence of secondary users.

10. The method of claim 1, wherein self-interference between a transmit chain and a receive chain due to minimal or no duplex spacing is mitigated by using one of adaptive cancellation or hybrid FDD (H-FDD).

11. The method of claim 1, further comprising:
moving one of the UL spectrum and the DL spectrum to at least one of a sub-leased, whitespace or unlicensed spectrum due to operational conditions, wherein the UL spectrum and the DL spectrum were using licensed spectrum.

12. The method of claim 1, further comprising:
dynamically swapping between licensed spectrum and at least one of sub-leased, whitespace or unlicensed spectrum.

13. The method claim 1, further comprising:
determining at least one of sub-leased, whitespace or unlicensed channel availability;
selecting at least one of sub-leased, whitespace or unlicensed channel based on bandwidth requirement for the UL and the DL;
allocating a selected sub-leased, whitespace or unlicensed channel; and
communicating on an allocated sub-leased, whitespace or unlicensed channel and a licensed channel.

14. The method of claim 1, further comprising:
aggregating licensed spectrum with at least one of sub-leased, whitespace or unlicensed spectrum, wherein the UL spectrum and the DL spectrum both include aggregated licensed spectrum and unlicensed spectrum.

15. A wireless communications system, comprising:
a processor configured to:
assess spectrum usage for uplink (UL) and downlink (DL) based on spectrum usage information, wherein the spectrum usage information includes quality of service requirements;
determine availability of spectrum based on sensing, wherein the spectrum is at least one of licensed, sub-leased, whitespace or unlicensed spectrum;
detect a presence of a primary user on an available whitespace spectrum on a condition that the primary user is using a previously available whitespace spectrum;
dynamically allocate UL spectrum and DL spectrum from the spectrum around a transmission by the primary user in a previously available unlicensed spectrum in view of spectrum usage assessment and spectrum availability, wherein spacing between the UL spectrum and the DL spectrum is variable; and
maintain communication between a base station and at least one wireless transmit/receive unit by avoiding interference with the transmission by the primary user.

16. The wireless communications system of claim 15, wherein the processor is further configured to aggregate licensed spectrum with at least one of sub-leased, whitespace or unlicensed spectrum, wherein the UL spectrum and the DL spectrum both include aggregated licensed spectrum and at least one of sub-leased, whitespace or unlicensed spectrum.

17. A method of implementing frequency division duplex (FDD), the method comprising:
assessing spectrum usage for uplink (UL) and downlink (DL) based on spectrum usage information, the spectrum usage information comprising quality of service requirements;
determining availability of spectrum based on sensing;
detecting a presence of a primary user on an available whitespace spectrum on a condition that the primary user is using a previously available whitespace spectrum;
dynamically allocating the UL spectrum and the DL spectrum from the spectrum around a transmission by the primary user in a previously available unlicensed spectrum in view of spectrum usage assessment and spectrum availability, a portion of one of the UL spectrum or the DL spectrum being allocated to the remaining one of the DL spectrum or the UL spectrum, respectively; and
maintaining communication between a base station and at least one wireless transmit/receive unit by avoiding interference with the transmission by the primary user.

18. The method of claim 17, further comprising aggregating licensed spectrum with at least one of sub-leased, whitespace or unlicensed spectrum, the UL spectrum and the DL spectrum both comprising aggregated licensed spectrum and at least one of sub-leased, whitespace or unlicensed spectrum.

19. The method of claim 17, the spectrum usage information comprising at least one of traffic patterns or bandwidth requirements.

20. The method of claim 17, further comprising moving one of the UL spectrum and the DL spectrum to at least one of a sub-leased, whitespace or unlicensed spectrum due to operational conditions, wherein the UL spectrum and the DL spectrum were using licensed spectrum.

* * * * *